United States Patent
Yeo et al.

(10) Patent No.: US 12,082,202 B1
(45) Date of Patent: Sep. 3, 2024

(54) METHOD AND DEVICE FOR TRANSMITTING OR RECEIVING SIGNAL IN WIRELESS COMMUNICATION SYSTEM

(71) Applicant: Samsung Electronics Co., Ltd., Suwon-si (KR)

(72) Inventors: Jeongho Yeo, Suwon-si (KR); Sungjin Park, Suwon-si (KR); Jonghyun Bang, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 866 days.

(21) Appl. No.: 17/054,490

(22) PCT Filed: May 13, 2019

(86) PCT No.: PCT/KR2019/005702
§ 371 (c)(1),
(2) Date: Aug. 10, 2021

(87) PCT Pub. No.: WO2019/216725
PCT Pub. Date: Nov. 14, 2019

(30) Foreign Application Priority Data

| May 11, 2018 | (KR) | 10-2018-0054575 |
| Aug. 24, 2018 | (KR) | 10-2018-0099457 |
| Sep. 27, 2018 | (KR) | 10-2018-0115353 |

(51) Int. Cl.
*H04W 72/23* (2023.01)
*H04W 72/0446* (2023.01)
*H04W 72/52* (2023.01)

(52) U.S. Cl.
CPC ....... *H04W 72/23* (2023.01); *H04W 72/0446* (2013.01); *H04W 72/52* (2023.01)

(58) Field of Classification Search
CPC .. H04W 72/23; H04W 72/0446; H04W 72/52
See application file for complete search history.

(56) References Cited

U.S. PATENT DOCUMENTS

| 8,214,713 B2 | 7/2012 | Hiraki et al. |
| 8,432,866 B1 | 4/2013 | Tapaninen |
| (Continued) | | |

FOREIGN PATENT DOCUMENTS

| CN | 101174932 A | 5/2008 |
| CN | 101516104 A | 8/2009 |
| (Continued) | | |

OTHER PUBLICATIONS

Qi, Yinan, et al. "On the physical layer design for low cost machine type communication in 3GPP LTE." 2014 IEEE 80th Vehicular Technology Conference (VTC2014-Fall). IEEE, 2014. (Year: 2014).*
Digish, K. G., and R. Thilagavathy. "ASIC implementation of physical downlink shared channel for LTE." 2014 International Conference on Control, Instrumentation, Communication and Computational Technologies (ICCICCT). IEEE, 2014. (Year: 2014).*
Notice of Reasons for Refusal dated Mar. 6, 2023, in connection with Japanese Application No. 2020-563643, 8 pages.
(Continued)

*Primary Examiner* — Sharad Rampuria

(57) ABSTRACT

Provided is a method and apparatus for transmitting or receiving a signal in a wireless communication system. In accordance with an embodiment of the disclosure, the method may involve determining a maximum data rate a terminal is able to support, comparing the maximum data rate with an actual data rate determined from scheduling information, and transmitting a signal according to the scheduling information based on a result of the comparing.

9 Claims, 10 Drawing Sheets

(56) References Cited

U.S. PATENT DOCUMENTS

| | | | |
|---|---|---|---|
| 8,817,806 B2 | 8/2014 | Kim et al. | |
| 8,848,658 B2 | 9/2014 | Gorokhov et al. | |
| 9,531,516 B2 | 12/2016 | Kim et al. | |
| 9,544,891 B2 | 1/2017 | Kim et al. | |
| 9,907,027 B2 | 2/2018 | Kim et al. | |
| 10,111,224 B2 | 10/2018 | Lee et al. | |
| 11,057,259 B2* | 7/2021 | Yeo | H04W 72/23 |
| 11,844,082 B2* | 12/2023 | Yang | H04W 52/365 |
| 2006/0067229 A1 | 3/2006 | Frederiksen | |
| 2011/0188377 A1 | 8/2011 | Kim et al. | |
| 2013/0083753 A1* | 4/2013 | Lee | H04L 1/1858 370/329 |
| 2014/0126404 A1 | 5/2014 | Kim et al. | |
| 2015/0289237 A1 | 10/2015 | Kim et al. | |
| 2015/0341912 A1* | 11/2015 | Kim | H04L 1/201 370/329 |
| 2016/0065338 A1 | 3/2016 | Kim et al. | |
| 2016/0107534 A1 | 4/2016 | Ikeda et al. | |
| 2016/0157260 A1 | 6/2016 | Laroia et al. | |
| 2016/0381620 A1 | 12/2016 | Panaitopol et al. | |
| 2018/0014255 A1 | 1/2018 | Pelletier et al. | |
| 2020/0404677 A1* | 12/2020 | Hua | H04W 72/23 |

FOREIGN PATENT DOCUMENTS

| | | |
|---|---|---|
| CN | 102396265 A | 3/2012 |
| CN | 104823422 A | 8/2015 |
| JP | 2005237031 A | 9/2005 |
| KR | 10-2007-0051347 A | 5/2007 |
| KR | 10-2011-0089684 A | 8/2011 |
| KR | 10-2014-0056899 A | 5/2014 |
| KR | 10-2014-0071480 A | 6/2014 |
| WO | 2009058152 A1 | 5/2009 |
| WO | 2014098358 A1 | 6/2014 |

OTHER PUBLICATIONS

Written Opinion of the International Searching Authority in connection with International Application No. PCT/KR2019/005702 dated Aug. 23, 2019, 5 pages (English translation).

Office Action dated Sep. 6, 2022 in connection with India Patent Application No. 202037050314, 6 pages.

International Search Report and Written Opinion of the International Searching Authority in connection with International Application No. PCT/KR2019/005702 dated Aug. 23, 2019, 9 pages.

Supplementary European Search Report dated Aug. 9, 2021, in connection with European Application No. 19800817.9, 8 pages.

Office Action dated Dec. 13, 2023, in connection with Korean Application No. 10-2018-0115353, 21 pages.

Notification of the First Office Action dated Sep. 27, 2023, in connection with Chinese Application No. 201980031640.X, 15 pages.

Communication under Rule 71(2) EPC dated Apr. 10, 2024, in connection with European Application No. 19800817.9, 54 pages.

Notification to Grant Patent Right for Invention dated Apr. 21, 2024, in connection with Chinese Application No. 201980031640.X, 7 pages.

Written Decision on Registration dated Apr. 29, 2024, in connection with Korean Application No. 10-2018-0115353, 11 pages.

Huawei, et al., "Discussion on UE peak data rate," R1-1803648, 3GPP TSG RAN WG1 Meeting #92bis, Sanya, China, Apr. 16-20, 2018, 6 pages.

Nokia Networks, et al., "UE maximum bitrate with eLWA," R2-164909, 3GPP TSG-RAN WG2 Meeting #95, Goteborg, Sweden, Aug. 22-26, 2016, 3 pages.

NTT DoCoMo, "Autonomous Rate Ramping for Common Rate Control," TSGR1(04)1208, TSG-RAN Working Group 1 #38bis, Seoul, Korea, Sep. 20-24, 2004, 8 pages.

* cited by examiner

METHOD AND DEVICE FOR TRANSMITTING OR RECEIVING SIGNAL IN WIRELESS COMMUNICATION SYSTEM

CROSS-REFERENCE TO RELATED APPLICATIONS

This application is a 371 National Stage of International Application No. PCT/KR2019/005702, filed May 13, 2019, which claims priority to Korean Patent Application No. 10-2018-0054575, filed May 11, 2018, Korean Patent Application No. 10-2018-0099457, filed Aug. 24, 2018, and Korean Patent Application No. 10-2018-0115353, filed Sep. 27, 2018, the disclosures of which are herein incorporated by reference in their entirety.

BACKGROUND

1. Field

The disclosure relates to a wireless communication system, and more particularly, to a method and apparatus for transmitting or receiving a signal based on an amount of data or a data rate that a terminal is able to process.

2. Description of Related Art

To meet demand due to ever-increasing wireless data traffic since the commercialization of the $4^{th}$ generation (4G) communication system, there have been efforts to develop an advanced $5^{th}$ generation (5G) system or pre-5G communication system. For this reason, the 5G or pre-5G communication system is also called a beyond 4G network communication system or post long term evolution (post LTE) system. Implementation of the 5G communication system using ultra-frequency (millimeter wave (mmWave)) bands, e.g., 60 GHz bands, is considered to achieve higher data rates. To reduce propagation loss of radio waves and to increase a transmission range of radio waves in the ultra-frequency bands, beamforming, massive multiple-input multiple-output (massive MIMO), full dimensional MIMO (FD-MIMO), array antenna, analog beamforming, and large-scale antenna techniques are under discussion for the 5G communication system. To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system. In addition, in the 5G system, an advanced coding modulation (ACM), e.g., hybrid frequency-shift keying (FSK) and quadrature amplitude modulation (QAM) modulation (FQAM), sliding window superposition coding (SWSC), and an advanced access technology, e.g., filter bank multi carrier (FBMC), non-orthogonal multiple access (NOMA), sparse code multiple access (SCMA) are being developed.

In the meantime, the Internet is evolving from a human-oriented connectivity network where humans generate and consume information to an Internet of things (IOT) network where distributed entities or things send, receive and process information without human intervention. Internet of everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor networks, machine to machine (M2M) communication, machine type communication (MTC) for connection between things are being studied. Such an IoT environment may provide intelligent Internet technology (IT) services that create new value to human life by collecting and analyzing data generated among connected things. IoT may be applied to a variety of areas, such as smart homes, smart buildings, smart cities, smart cars or connected cars, smart grids, health care, smart home appliances and advanced medical services through convergence and combination between existing information technologies (IT) and various industrial applications.

In this regard, various attempts to apply the 5G communication system to the IoT network are being made. For example, technologies regarding sensor networks, M2M communication, MTC, etc., are implemented by the 5G communication technologies, such as beamforming, MIMO, and array antenna schemes, etc. Even application of a cloud radio access network (cloud RAN) as the aforementioned big data processing technology may be an example of convergence of 5G and IoT technologies.

With the development of the aforementioned technologies and wireless communication systems, it is possible to provide various services, and there is a need for a method to provide the services smoothly.

SUMMARY

The disclosure provides a method of transmitting or receiving a signal, by which to minimize occasions of a difference occurring between a data rate that a terminal may actually support and a data rate determined based on information regarding a resource used for data transmission.

The disclosure provides a method and apparatus for transmitting or receiving a signal in a wireless communication system. In accordance with an embodiment of the disclosure, a method may involve determining a maximum data rate a terminal is able to support, comparing the maximum data rate with an actual data rate determined from scheduling information, and transmitting a signal according to the scheduling information based on a result of the comparing.

The disclosure may minimize occasions of not matching between a data rate supported by a terminal and a transport block size to be scheduled, in a new radio (NR) system. Furthermore, the disclosure may provide an operating method of a terminal when the terminal receives a transport block in size corresponding to a value greater than a data rate supported by the terminal.

DETAILED DESCRIPTION

Figure 1:
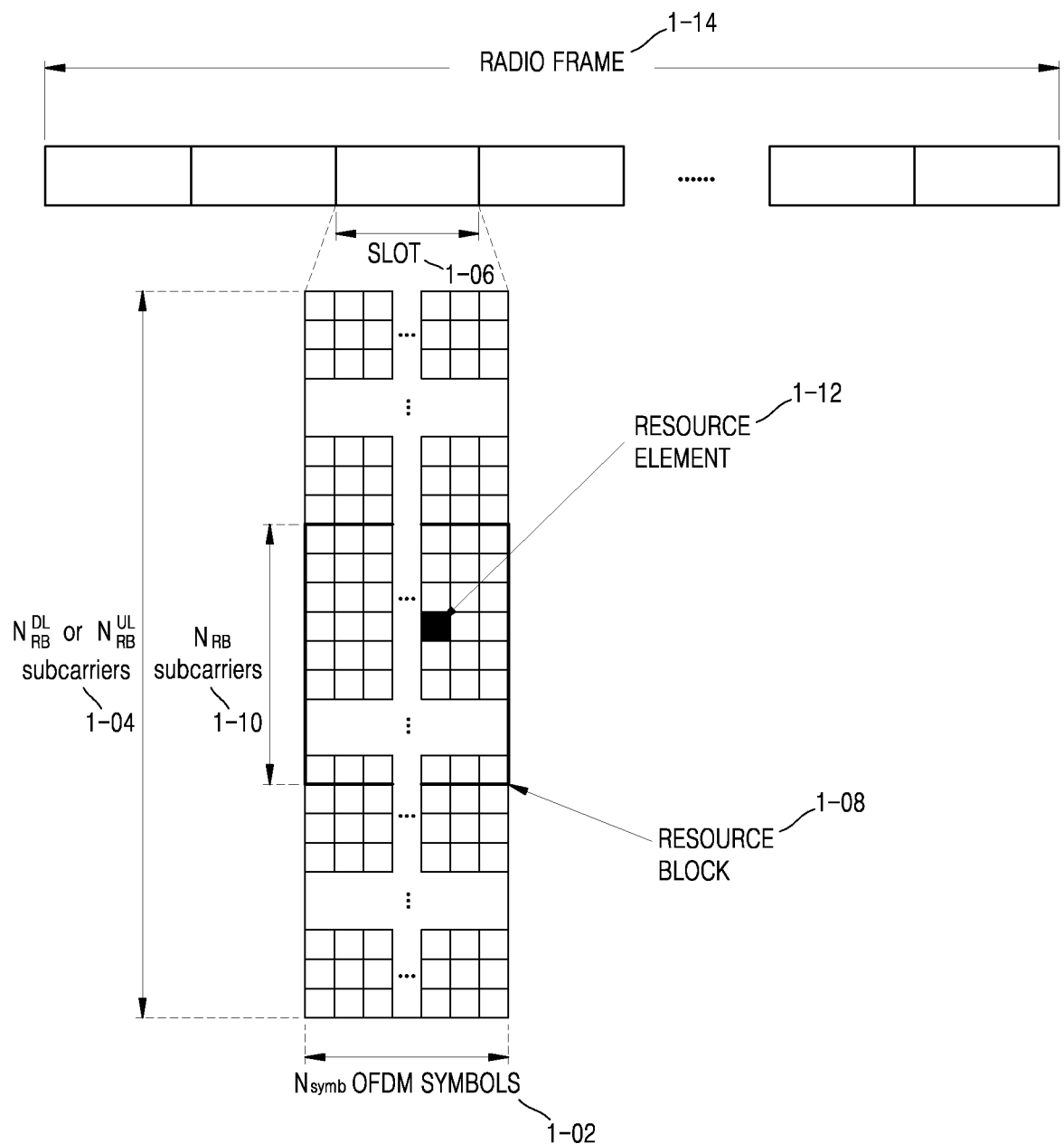
FIG. 1 is a diagram illustrating a basic structure of a time-frequency domain, which is a radio resource region where data or control channel is transmitted on a downlink or uplink in a new radio (NR) system.

According to an embodiment, a method, performed by a terminal, of transmitting or receiving a signal includes: receiving from a base station downlink control information regarding data received through a physical downlink shared channel (PDSCH); determining a number of transport blocks (TBs) allocated in a slot based on the downlink control information; determining a data rate of the terminal based on the number of TBs allocated in the slot; and determining whether to decode the data based on a result of a comparison between a maximum data rate of the terminal and the determined data rate.

The determining of whether to decode the data may include determining that data decoding at the terminal is not required when the determined data rate is equal to or lower than the maximum data rate.

The data rate may be determined based on the number of TBs allocated in an overlapped slot for each serving cell of the terminal.

According to an embodiment, a method, performed by a base station, of transmitting or receiving a signal includes: determining a maximum data rate of a terminal based on capability information received from the terminal; determining a data rate of the terminal based on a number of transport blocks (TBs) allocated in a slot for the terminal; and transmitting data on a physical downlink shared channel (PDSCH) based on a result of a comparison between the maximum data rate and the data rate. Whether to decode the data at the terminal may be determined based on the result of the comparison between the maximum data rate and the data rate.

The determining of whether to decode the data may include determining that data decoding at the terminal is not required when the determined data rate is equal to or lower than the maximum data rate.

The data rate may be determined based on the number of TBs allocated in an overlapped slot for each serving cell of the terminal.

The determining of the data rate of the terminal may include determining a data rate corresponding to a particular TB size based on information regarding data rates for respective TB sizes stored in advance.

According to an embodiment, a terminal for transmitting or receiving a signal includes: a transceiver; and at least one processor, wherein the at least one processor may control the transceiver to receive from a base station downlink control information regarding data received through a physical downlink shared channel (PDSCH), determine the number of transport blocks (TBs) allocated in a slot based on the downlink control information, determine a data rate of the terminal based on a number of TBs allocated in the slot, and determine whether to decode the data based on a result of a comparison between maximum data rate of the terminal and the determined data rate.

According to an embodiment, a base station for transmitting or receiving a signal includes: a transceiver; and at least one processor, wherein the at least one processor may determine a maximum data rate of a terminal based on capability information received from the terminal, determine a data rate of the terminal based on a number of transport blocks (TBs) allocated in a slot for the terminal, and control the transceiver to transmit data on a physical downlink shared channel (PDSCH) based on a result of a comparison between the maximum data rate and the data rate. Whether to decode the data at the terminal may be determined based on the result of the comparison between the maximum data rate and the data rate.

To meet demand due to ever-increasing wireless data traffic since commercialization of the $4^{th}$ generation (4G) communication system, there have been efforts to develop an advanced $5^{th}$ generation (5G) system or pre-5G communication system. For this reason, the 5G or pre-5G communication system is also called a beyond 4G network communication system or post long term evolution (post LTE) system. The 5G communication system defined by the $3^{rd}$ Generation Partnership Project (3GPP) is called a new radio (NR) system. Implementation of the 5G communication system using ultra-frequency (millimeter wave (mmWave)) bands, e.g., 60 GHz bands, is considered to achieve higher data rates. To reduce propagation loss of radio waves and to increase a transmission range of radio waves in the ultra-frequency bands, beamforming, massive multiple-input multiple-output (massive MIMO), full dimensional MIMO (FD-MIMO), array antenna, analog beamforming, and large-scale antenna techniques are under discussion for the 5G communication system and are applied to an NR system. To improve system networks, technologies for advanced small cells, cloud radio access networks (RANs), ultra-dense networks, device to device (D2D) communication, wireless backhaul, moving networks, cooperative communication, coordinated multi-points (COMP), reception-end interference cancellation and the like are also being developed in the 5G communication system. In addition, in the 5G system, an advanced coding modulation (ACM), e.g., hybrid frequency-shift keying (FSK) and quadrature amplitude modulation (QAM) modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IOT) network where distributed entities or things send, receive and process information without human intervention. Internet of everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor network, machine to machine (M2M), machine type communication (MTC) for connection between things are being studied. Such an IoT environment may provide intelligent Internet technology (IT) services that create new value to human life by collecting and analyzing data generated among connected things. IoT may be applied to a variety of areas, such as smart home, smart buildings, smart cities, smart cars or connected cars, smart grid, health care, smart home appliances and advanced medical services through convergence and combination between existing information technologies (IT) and various industrial applications.

In this regard, various attempts to apply the 5G communication system to the IoT network are being made. For example, 5G communication such as a sensor network, M2M, MTC, etc., is implemented by such techniques as beamforming, MIMO, and array antenna, etc. Even application of a cloud radio access network (cloud RAN) as the aforementioned big data processing technology may be an example of convergence of 5G and IoT technologies.

In the meantime, a NR access technology for new 5G communication is designed to freely multiplex various services in time and frequency resources, so that a waveform/numerology or the like, and a reference signal or the like, may be dynamically or freely allocated as required for the corresponding service. For wireless communication to provide a best service to a terminal, it is important to optimize data transmission through measurement of quality and interference of a channel, and accordingly, channel state measurement is essential. However, unlike the 4G communication where channel and interference properties are not significantly changed depending on frequency resources, a 5G or NR channel has channel and interference properties that significantly change depending on services and is thus required to support a frequency resource group (FRG)-wise subset, which enables division of the measurement. In the meantime, service types supported in the NR system may be divided into categories, such as enhanced mobile broadband (eMBB), massive machine type communications (mMTC), ultra-reliable and low-latency communications (URLLC), etc. The eMBB is a service for high rate transmission of high volume data, the mMTC is a service for least power consumption at the terminal and accesses of multiple terminals, and the URLLC is a service for high reliability and low latency. Depending on the type of service applied to the terminal, different requirements may be applied.

In the meantime, as a study on next generation communication systems is being conducted these days, various schemes for scheduling communication with a terminal are being discussed. Hence, an efficient scheduling and data transmission/reception scheme in consideration of characteristics of the next generation communication system is required.

In the communication system, a plurality of services may be provided for a user, and to provide such a plurality of services for the user, a method of providing the respective services to fit their characteristics in a same time interval and a corresponding apparatus may be required.

Embodiments of the disclosure will be described in detail with reference to accompanying drawings.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for attaining them will be understood more clearly with reference to the following embodiments of the disclosure, which will be described in detail later along with the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternate embodiments of the disclosure. For example, two successive blocks may be performed substantially at the same time or in reverse order.

Furthermore, the term 'unit' or 'module' as herein used refers to a software or hardware component, such as field programmable gate array (FPGA) or application specific integrated circuit (ASIC) which plays a certain role. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a less number of components and modules, or further divided into a more number of components and modules. Moreover, the components and modules may be implemented to execute one or more central processing units (CPUs) in a device or security multimedia card. In embodiments, the module may include one or more processors.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), 3GPp2 high rate packet data (HRPD), ultra mobile broadband (UMB), and IEEE 820.16e communication standards. Furthermore, for the fifth generation (5G) wireless communication system, communication standards for 5G or new radio (NR) are being made.

As a representative example of a wide band wireless communication system, the NR system employs orthogonal frequency division multiplexing schemes for downlink (DL) and uplink (UL). In detail, a cyclic prefix OFDM (CP-OFDM) scheme is employed for DL, and together with the CP-OFDM, discrete Fourier transform spreading OFDM (DFT-S-OFDM) scheme is employed for UL. The UL refers to a radio link for a terminal (hereinafter, referred to as a user equipment (UE) or a mobile station (MS)) to transmit data or a control signal to a base station (BS or gNode B), and the DL refers to a radio link for a BS to transmit data or a control signal to a UE. Such a multiple access scheme allocates and operates time-frequency resources for carrying data or control information for respective users not to overlap each other, i.e., to maintain orthogonality, thereby differentiating each user's data or control information.

The NR system adopts a hybrid automatic repeat request (HARQ) scheme that retransmits corresponding data at the physical layer in case decoding fails at an early stage of transmission. By the HARQ scheme, if a receiver fails to correctly decode data, the receiver transmits information indicating the decoding failure (NACK; Negative Acknowledgment) to a transmitter so that the transmitter may retransmit the corresponding data at the physical layer. The receiver may increase data reception capability by combining the data retransmitted by the transmitter with the data for which decoding has failed. Further, in a case that the receiver correctly decodes data, the receiver may transmit information indicating decoding success (ACK; Acknowledgment) to the transmitter so that the transmitter may transmit new data.

FIG. 1 is a diagram illustrating a basic structure of time-frequency domain, which is a radio resource region where data or control channel is transmitted on downlink or uplink in an NR system.

In FIG. 1, the horizontal axis represents the time domain, and the vertical axis represents the frequency domain. A minimum transmission unit in the time domain is an OFDM symbol, and Nsymb OFDM symbols 1-02 together define a slot 1-06. A subframe may be defined to be 1.0 ms long, and a radio frame 1-14 may be defined to be 10 ms long. A minimum transmission unit in the frequency domain is a subcarrier, and bandwidth of the whole system transmission band may be comprised of a total of $N_{RB}^{DL}$ or $N_{RB}^{UL}$ subcarriers 1-04.

The basic resource unit in the time-frequency domain is a resource element 1-12 (RE), which may be represented by an OFDM symbol index and a subcarrier index. A resource block (RB) 1-08 or a physical resource block (PRB) may be defined with Nsymb successive OFDM symbols 1-02 in the time domain and NRB successive subcarriers 1-10 in the frequency domain. Accordingly, one RB 1-08 may include Nsymb x NRB REs. Generally, a minimum transmission unit of data is an RB. In a general NR system, Nsymb=14, NRB=12, and $N_{RB}^{DL}$, $N_{RB}^{UL}$ and NRB are proportional to bandwidth of the system transmission band. Furthermore, data rate may increase in proportion to the number of RBs scheduled for the UE.

In the NR system, for the FDD system that operates DL and UL distinguished by frequency, downlink transmission bandwidth may differ from uplink transmission bandwidth. Channel bandwidth refers to RF bandwidth corresponding to the system transmission bandwidth. Table 1 represents correspondence between system transmission bandwidth and channel bandwidth defined in an LTE system for 4G wireless communication before the NR system. For example, an LTE system having a 10 MHz channel bandwidth may have transmission bandwidth consisting of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The NR system may operate in wider channel bandwidth than the channel bandwidth for LTE presented in table 1.

In the NR system, scheduling information for DL data or UL data may be transmitted through downlink control information (DCI) from the BS to the UE. The DCI may be defined in various formats, and each format may indicate whether it is scheduling information for UL data (UL grant) or scheduling information for DL data (DL grant), whether it is compact DCI with small-sized control information, whether spatial multiplexing is applied using multiple antennas, whether it is DCI for power control, etc. For example, DCI format 1-1 that is scheduling control information for DL data (DL grant) may include one piece of the following control information:

carrier indicator: indicates which frequency carrier is used for transmission.
  DCI format indicator: an indicator for distinguishing whether the DCI is for DL or UL.
  bandwidth part (BWP) indicator: indicates which BWP is used for transmission.
  frequency domain resource allocation: indicates an RB in the frequency domain allocated for data transmission. A resource represented according to system bandwidth and a resource allocation scheme is determined.
  time domain resource allocation: indicates which slot and which OFDM symbol in the slot are used to transmit a data-related channel.
  VRB-to-PRB mapping: indicates which scheme is used to map a virtual RB (VRB) index and a physical RB (PRB) index.
  modulation and coding scheme (MCS): indicates a modulation scheme and a coding rate used for data transmission. That is, it may indicate a coding rate that may give TBS and channel coding information along with information about whether it is QPSK, 16QAM, 64QAM, or 256QAM.
  code block group (CBG) transmission information: indicates information about which CBG is transmitted when CBG retransmission is configured.
  HARQ process number: indicates a process number of an HARQ.
  new data indicator: indicates whether it is HARQ initial transmission or retransmission.
  redundancy version: indicates a redundancy version of an HARQ.

transmit power control (TPC) command for physical uplink control channel (PUCCH): indicates a transmit power control command for UL control channel PUCCH.

For PUSCH transmission, time domain resource allocation may be delivered by information regarding a slot in which a PUSCH is transmitted, a start symbol position S in the slot, and the number L of symbols to which the PUSCH is mapped. Here, the S may be a relative position from the beginning of the slot, the L may be the number of successive symbols, and the S and L may be determined from a start and length indicator value (SLIV) defined as follows:

if$(L-1) \leq 7$ then $SLIV = 14 \cdot (L-1) + S$ else $SLIV = 14 \cdot (14-L+1) + (14-1-S)$ where $0 < L \leq 14-S$ The NR system may be configured with a table including information about an SLIV value, a PUSCH mapping type, and a slot in which the PUSCH is transmitted in a row commonly through RRC configuration. Subsequently, time domain resource allocation in DCI indicates an index value in the configured table, so that the BS may deliver information about an SLIV value, a PUSCH mapping type, and a slot in which the PUSCH is transmitted to the UE.

In the NR system, type A and type B may be defined for the PUSCH mapping type. For the PUSCH mapping type A, the first of DMRS symbols may be located in the second or third OFDM symbol in a slot. For the PUSCH mapping type B, the first of DMRS symbols may be located in the first OFDM symbol in a time domain resource allocated in PUSCH transmission.

DCI may be transmitted on a physical downlink control channel (PDCCH) (or control information, which is interchangeably used with the PDCCH) after going through channel coding and modulation processes.

In general, DCI may be scrambled by a specific radio network temporary identifier (RNTI) separately for each UE, having cyclic redundancy check (CRC) added thereto, channel-coded, and then configured and transmitted in a separate PDCCH. The PDCCH may be mapped and transmitted in a control resource set (CORESET) configured for the UE.

DL data may be transmitted on a physical downlink shared channel (PDSCH), which is a physical channel for DL data transmission. The PDSCH may be transmitted after a control channel transmission interval, and scheduling information such as a specific mapping position in the frequency domain, modulation scheme, etc., may be determined based on the DCI transmitted through the PDCCH.

Through an MCS of the control information that makes up the DCI, the BS may notify the UE of a modulation scheme applied to the PDSCH for transmission and the size of data to be transmitted (transport block size; TBS). In an embodiment, an MCS may be configured in 5 bits or more than or less than 5 bits. The TBS corresponds to the size before channel coding for error correction is applied to the data (transport block; TB) to be transmitted by the base station.

In the disclosure, the transport block (TB) may include a medium access control (MAC) header, a MAC control element (CE), one or more MAC service data units (MAC SDUs), and padding bits. In another example, the TB may refer to a data unit or a MAC protocol data unit (MAC PDU) sent down to the physical layer from the MAC layer.

The NR system supports the following modulation schemes: QPSK (Quadrature Phase Shift Keying), 16QAM (Quadrature Amplitude Modulation), 64QAM, and 256QAM, and their respective modulation orders Qm are 2, 4, 6, and 8. For example, two bits per symbol may be transmitted for QPSK modulation, 4 bits per symbol for 16QAM modulation, 6 bits per symbol for 64QAM modulation, and 8 bits per symbol for 256QAM modulation.

Figure 2:
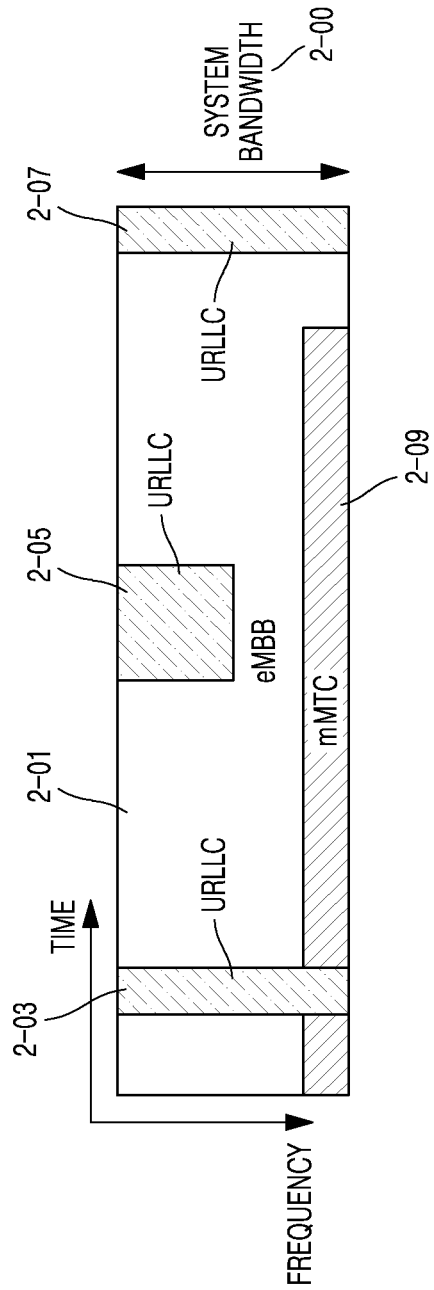
FIGS. 2 and 3 are diagrams for describing allocation of data for enhanced Mobile BroadBand (eMBB), Ultra-Reliable and Low-Latency Communications (URLLC), and massive Machine Type Communications (mMTC) services considered in a $5^{th}$ generation (5G) or new radio (NR) system on frequency-time resources.
Figure 3:
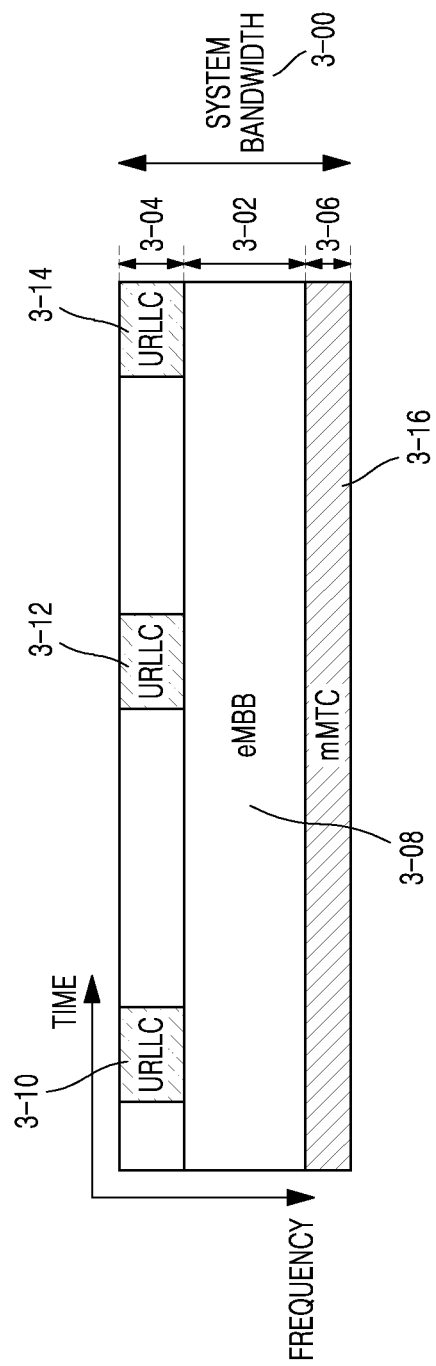

FIGS. 2 and 3 are diagrams for describing allocation of data for eMBB, URLLC, and mMTC services considered in a 5G or NR system on frequency-time resources.

How frequency and time resources are allocated for information transmission in each system will be seen in FIGS. 2 and 3.

First, FIG. 2 illustrates data for eMBB, URLLC, and mMTC allocated in a whole system frequency band 2-00. When URLLC data 2-03, 2-05, and 2-07 occurs and is required to be transmitted while eMBB data 2-01 and mMTC data 2-09 are allocated and transmitted in a particular frequency band, the BS or the UE may transmit the URLLC data 2-03, 2-05, and 2-07 without emptying or transmitting the part already allocated the eMBB data 2-01 and the mMTC data 2-09. Of the aforementioned services, URLLC requires reduction in latency, so that the URLLC data 2-03, 2-05, and 2-07 may be allocated and transmitted in a portion of the resource allocated the eMBB data 2-01. Of course, when the URLLC data 2-03, 2-05, and 2-07 are additionally allocated and transmitted in the resource allocated the eMBB data 2-01, the eMBB data may not be transmitted in the overlapping frequency-time resource and thus, the transmission performance for eMBB data may be reduced. In other words, in this case, eMBB data transmission failure may occur due to the allocation of the URLLC data.

In FIG. 3, how a service and data are transmitted in respective sub-bands 3-02, 3-04, and 3-06 divided from a whole system frequency band 3-00 is described. Information regarding sub-band configuration may be pre-determined, and the information may be transmitted by higher signaling from a BS to a UE. In another example, information regarding sub-bands may be divided arbitrarily by the BS or a network node to provide services for the UE without transmission of separate sub-band configuration information. In FIG. 3, it is assumed that the sub-band 3-02 is used to transmit eMBB data 3-08, the sub-bad 3-04 is used to transmit URLLC data 3-10, 3-12, and 3-14, and the sub-band 3-06 is used to transmit mMTC data 3-16.

In embodiments of the disclosure, length of a transmission time interval (TTI) used for URLLC data transmission may be shorter than a TTI length used for the eMBB data or the mMTC data. Furthermore, a response to information regarding the URLLC data may be transmitted faster than the eMBB data or the mMTC data, and accordingly, the information may be transmitted or received with low latency. To transmit the aforementioned three services or data, physical layer channels used for the respective types may have different structures. For example, at least one of a length of transmission time interval (TTI), a frequency resource allocation unit, a control channel structure, and a data mapping method may be different.

Although three types of service and three types of data are assumed and described in the embodiments as described above, there may be more types of services and corresponding data, and even in this case, descriptions of the disclosure may be applied.

In describing a method and apparatus proposed in the disclosure, the terms physical channel and signal in the NR system may be used. However, the disclosure may be applied not only to the NR system but also to other wireless communication systems.

Figure 4:
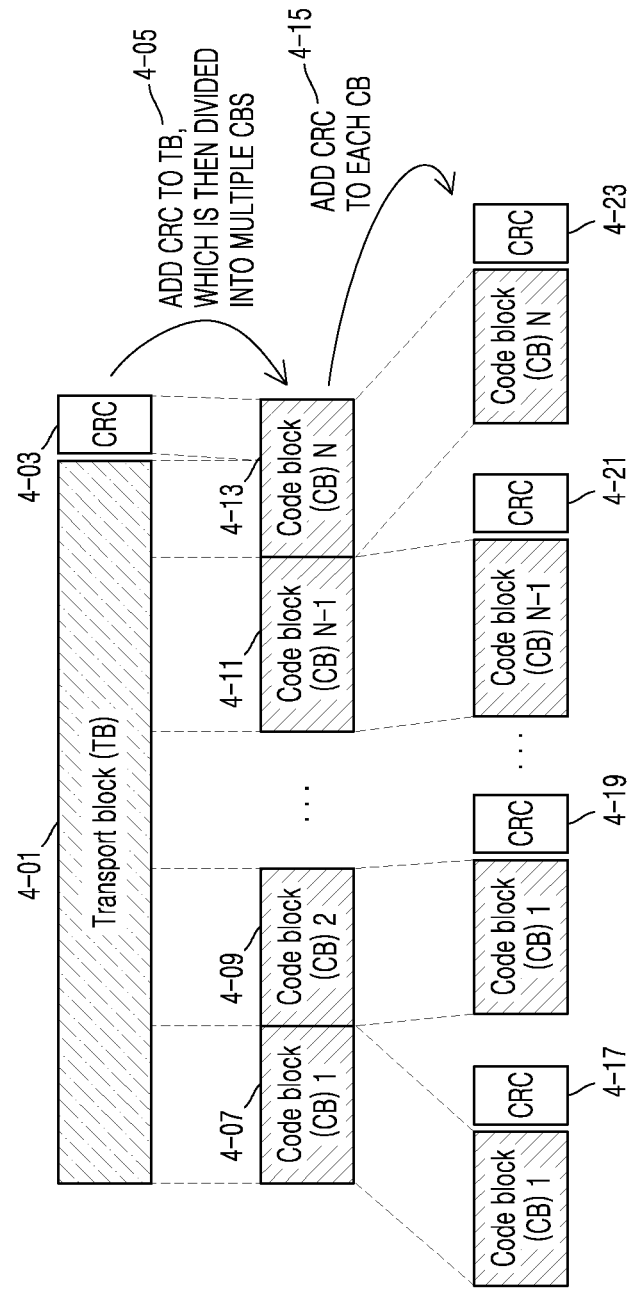
FIG. 4 is a diagram for describing a procedure in which a transport block is divided into multiple code blocks and cyclic redundancy check (CRC) is added thereto, according to an embodiment.

FIG. 4 is a diagram for describing a procedure in which a transport block is divided into multiple code blocks and CRC is added thereto, according to an embodiment.

Referring to FIG. 4, one transport block TB 4-01 to be transmitted in UL or DL may have CRC 4-03 added to the first or last part. The CRC 4-03 may be in 16 or 24 bits, or in a prefixed number of bits, or in a variable number of bits depending on the channel condition, and may be used in determining whether channel coding is successful. A block with the TB 4-01 and the CRC 4-03 added thereto may be divided into several code blocks CBs 4-07, 4-09, 4-11, and 4-13, in 4-05. Division into the code blocks may be made with a maximum size predetermined for the code block, in which case the last code block 4-13 may be smaller in size than the other code blocks 4-07, 4-09, and 4-11. It is, however, an example, and in another example, the last code block 4-13 and the other code blocks 4-07, 4-09, and 4-11 may have the same length by inserting 0(s), a random value, or 1(s) to the last code block 4-13. CRCs 4-17, 4-19, 4-21, and 4-23 may be added to the code blocks 4-07, 4-09, 4-11, and 4-13, respectively. The CRC may be in 16 or 24 bits, or in a prefixed number of bits, and may be used in determining whether channel coding is successful.

The TB 4-01 and a cyclic generator polynomial may be used to generate the CRC 4-03, and the cyclic generator polynomial may be defined in various methods. For example, assuming that cyclic generator polynomial for 24 bit CRC, $gCRC24A(D)=D^{24}+D^{23}+D^{18}+D^{17}+D^{14}+D^{11}+D^{10}+D^7+D^6+D^5+D^4+D^3+D+1$, given L=24, CRC $p_0, p_1, p_2, p_3, \ldots, p_{L-1}$ for TB data $\alpha_0, \alpha_1, \alpha_2, \alpha_3, \ldots, \alpha_{A-1}$ may be determined to be such a value that makes the remainder of division of $\alpha_0 D^{A+23}+\alpha_1 D^{A+22}+ \ldots +\alpha_{A-1}D^{24}+p_0 D^{23}+p_1 D^{22}+ \ldots +p_{22}D^1+p_{23}$ by gCRC24A(D) zero. Although the CRC length L is assumed as 24 in the above example, the CRC length L may be determined to be any of various lengths 12, 16, 24, 32, 40, 48, 64, etc.

After the CRC is added to the TB in this manner, the resultant TB may be divided into N CBs 4-07, 4-09, 4-11, and 4-13. The CRCs 4-17, 4-19, 4-21, and 4-23 may be added to the split CBs 4-07, 4-09, 4-11, and 4-13, respectively, in 4-15. The CRC added to the CB may have different length from the CRC added for the TB or a different cyclic generator polynomial may be used for the CRC for the CB. Alternatively, the CRC 4-03 added to the TB and the CRCs 4-17, 4-19, 4-21, and 4-23 added to the code blocks may be omitted depending on a type of channel code to be applied to the code blocks. For example, when LDPC codes are applied to the code blocks instead of turbo codes, the CRCs 4-17, 4-19, 4-21, and 4-23 that would otherwise be inserted to the code blocks may be omitted.

Alternatively, even when the LDPC is applied, the CRCs 4-17, 4-19, 4-21, and 4-23 may be added to the code blocks as they are. Moreover, even when polar codes are used, the CRCs may be added or omitted.

As described above in connection with FIG. 4, for a TB to be transmitted, a maximum length of a code block may be determined based on a type of applied channel coding, and based on the maximum length of the code block, the TB and a CRC added to the TB may be divided into the code blocks.

In the conventional LTE system, a CRC for CB may be added to the split CB, and coded bits may be determined by encoding data bits and the CRC of the CB with channel codes, and the number of bits to be rate-matched as agreed for the respective coded bits may be determined.

Figure 5:
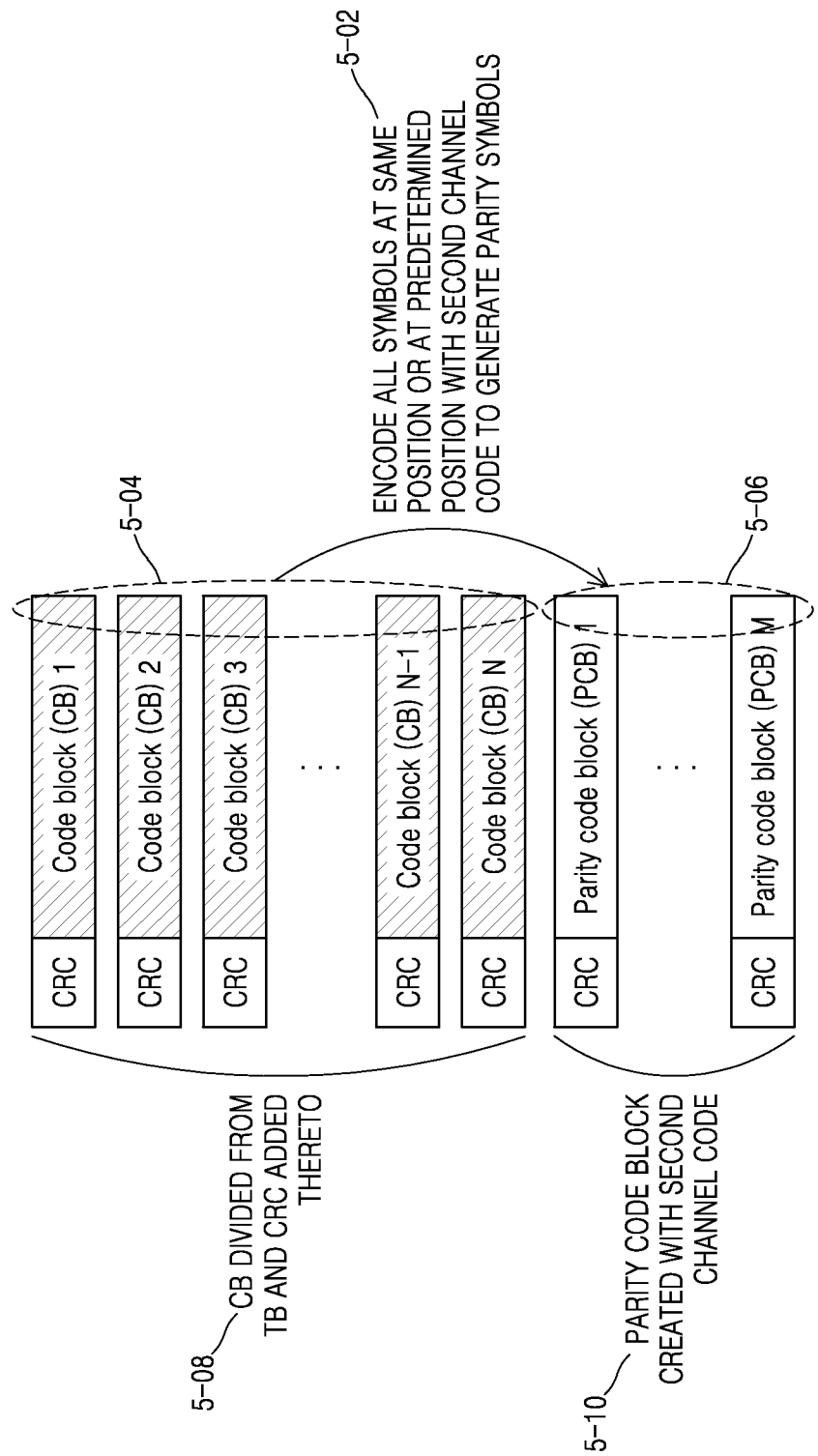
FIG. 5 is a diagram for describing a transmission method using an outer code, according to an embodiment.

FIG. 5 is a diagram for describing a transmission method using an outer code, according to an embodiment. Furthermore, FIG. 6 is a block diagram for describing a structure of a communication system in which an outer code is used, according to an embodiment.

Figure 6:
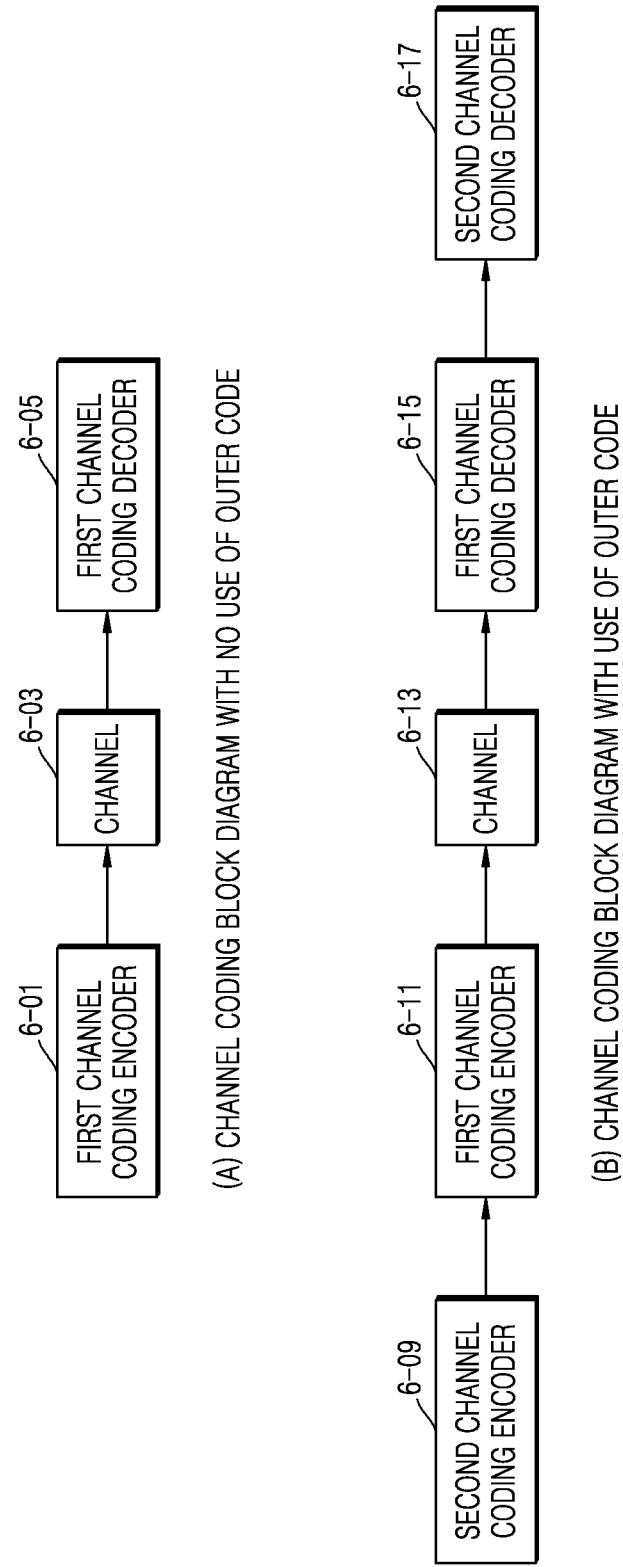
FIG. 6 is a block diagram for describing a structure of a communication system in which an outer code is used, according to an embodiment.

Referring to FIGS. 5 and 6, a method of transmitting a signal using an outer code will be focused.

In FIG. 5, a transport block may be divided into several code blocks, and then bits or symbols 5-04 at the same position in the respective code blocks are encoded with a second channel code, thereby generating parity bits or symbols 5-06, in 5-02. Subsequently, CRCs may be added to the respective code blocks and parity code blocks generated through second channel code encoding, in 5-08 and 5-10.

Whether to add the CRC may be determined based on the type of channel code. For example, when a turbo code is used as a first channel code, the CRCs 5-08 and 5-10 may be added, and subsequently the respective code blocks and parity code blocks may be encoded through first channel code encoding. In the disclosure, for the first channel code, a convolutional code, an LDPC code, a turbo code, a polar code, etc., may be used. However, they are only an example, and other various channel codes may be applied as the first channel code in the disclosure. In the disclosure, for the second channel code, for example, a Reed-Solomon code, a BCH code, a Raptor code, a parity bit generation code, etc., may be used. However, they are only an example, and other various channel codes may be applied as the second channel code in the disclosure.

Referring to (a) of FIG. 6, in a case that an outer code is not used, only a first channel coding encoder 6-01 and a first channel coding decoder 6-05 are used in the transmitter and the receiver, respectively, and a second channel coding encoder and a second channel coding decoder may not be used. Even in the case that the outer code is not used, the first channel coding encoder 6-01 and the first channel coding decoder 6-05 may be configured as equally as in a case where the outer code is used, which will be described below.

Referring to (b) of FIG. 6, in a case that the outer code is used, data to be transmitted may pass a second channel coding encoder 6-09. Bits or symbols having passed the second channel coding encoder 6-09 may pass a first channel coding encoder 6-11. When the channel coded symbols pass a channel 6-13 and arrive at the receiver, the receiver may sequentially operate a first channel coding decoder 6-15 and a second channel coding decoder 6-17 based on the received signal. The first channel coding decoder 6-15 and the second channel coding decoder 6-17 may perform operations corresponding to the first channel coding encoder 6-11 and the second channel coding encoder 6-09, respectively.

Figure 7:
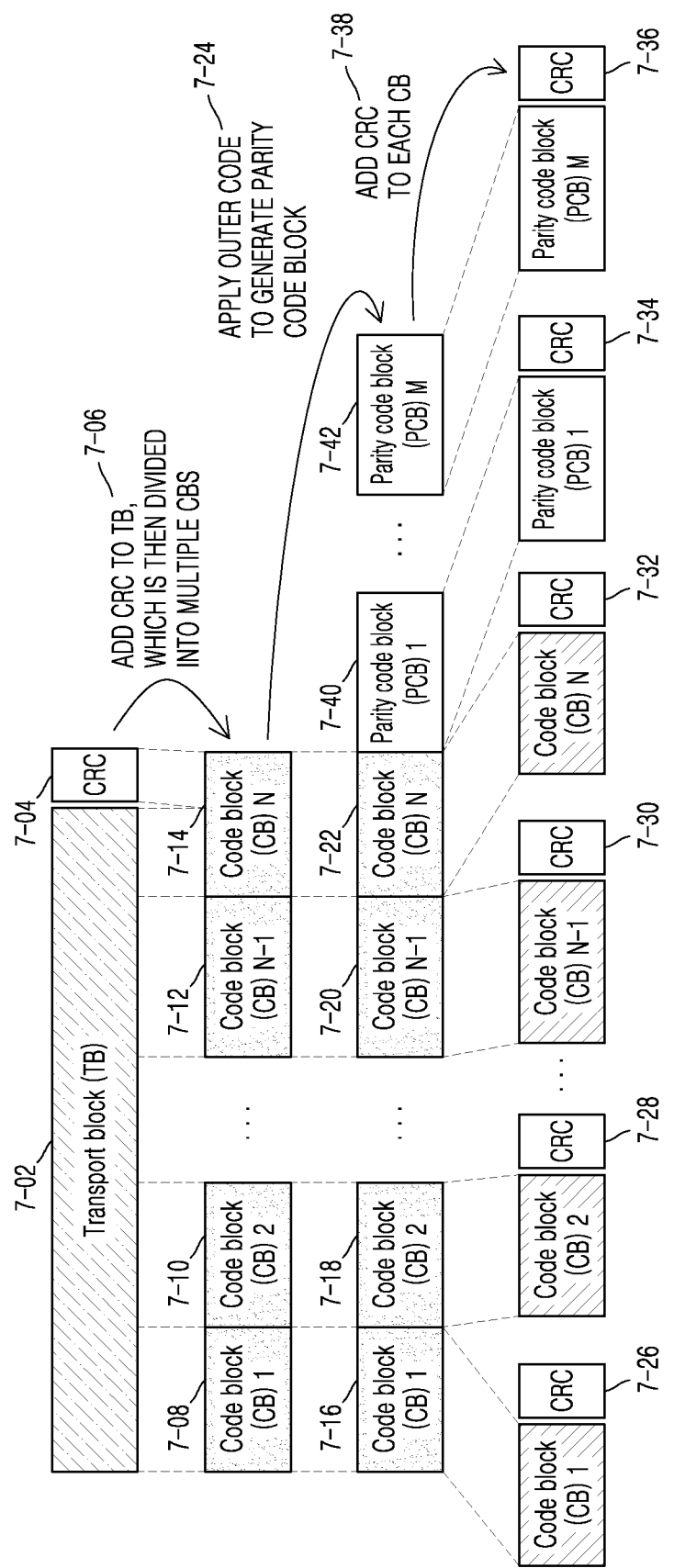
FIG. 7 is a diagram for describing a method of generating one or more parity code blocks by applying a second channel code or an outer code to multiple code blocks divided from a transport block, according to an embodiment.

FIG. 7 is a diagram for describing a method of generating one or more parity code blocks by applying a second channel code or an outer code to multiple code blocks divided from a transport block, according to an embodiment.

As described above in connection with FIG. 4, a transport block may be divided into one or more code blocks. In this case, when only one code block is generated due to the size of the transport block, a CRC may not be added to the code block. When an outer code is applied to the code blocks to be transmitted, parity code blocks 7-40 and 7-42 may be generated in 7-24. When the outer code is used, the parity code blocks 7-40 and 7-42 may be located after the last code block, in 7-24. After the outer code, CRCs 7-26, 7-28, 7-30, 7-32, 7-34, and 7-36 may be added, in 7-38. Subsequently, the respective code blocks and parity code blocks with the CRCs may be encoded with a channel code.

In an NR system, a size of the TB may be calculated via the following steps:

Step 1: calculate the number of REs $N'_{RE}$ allocated for PDSCH mapping in a PRB in an allocated resource.

$N'_{RE}$ may be calculated to be $N_{SC}^{RB} \cdot N_{symb}^{sh} - N_{DMRS}^{PRB} - N_{oh}^{PRB}$. $N_{sc}^{RB}$ is 12, and $N_{symb}^{sh}$ may represent the number of OFDM symbols allocated for the PDSCH. $N_{DMRS}^{PRB}$ is the number of REs in a PRB, which are occupied by DMRS of the same CDM group. $N_{oh}^{PRB}$ is the number of REs occupied by overhead in a PRB configured by higher signaling, which may be configured to be one of 0, 6, 12, and 18. Subsequently, a total number of RES $N_{RE}$ allocated for the PDSCH may be calculated. $N_{RE}$ Is calculated to be $\min(156, N'_{RE}) \cdot n_{PRB}$, and $n_{PRB}$ represents the number of PRBs allocated for the UE.

Step 2: The number of arbitrary information bits $N_{info}$ may be calculated to be $N_{RE}*R*Q_m*v$. R denotes a code rate, and Qm denotes a modulation order, the information of which may be delivered in an MCS bit field in control information and using a table determined beforehand. v is the number of layers allocated. When $N_{info} \leq 3824$, the TBS may be calculated in the following step 3. Otherwise, the TBS may be calculated in step 4.

Step 3: $N'_{info}$ may be calculated in formulas $$N'_{info} = \max\left(24, 2^n * \left\lfloor \frac{N_{info}}{2^n} \right\rfloor\right)$$

and $n=\max(3, \lceil \log_2(N_{info}) \rceil - 6)$. The TBS may be determined to be a value nearest to $N'_{info}$ among values not smaller than $N'_{info}$ in the following Table 2.

TABLE 2

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: $N_{info}$ may be calculated in formulas $$N'_{info} = \max\left(3840, 2^n \times \text{round}\left(\frac{N_{info} - 24}{2^n}\right)\right)$$

and $n=\lfloor \log_2(N_{info}-24) \rfloor - 5$. The TBS may be determined by value $N'_{info}$ and the following [pseudo-code 1].

[Start Pseudo-Code 1]
  if R≤¼

$$TBS = 8 * C * \left\lceil \frac{N'_{info} + 24}{8 * C} \right\rceil - 24,$$

where $$C = \left\lceil \frac{N'_{info} + 24}{3816} \right\rceil$$

else
  if $N'_{info} > 8424$ $$TBS = 8 * C * \left\lceil \frac{N'_{info} + 24}{8 * C} \right\rceil - 24,$$

where $$C = \left\lceil \frac{N'_{info} + 24}{8424} \right\rceil$$

else $$TBS = 8 * \left\lceil \frac{N'_{info} + 24}{8} \right\rceil - 24$$

end if
  end if
[End Pseudo-Code 1]

In the NR system, when a CB is input to an LDPC encoder, it may be output with parity bits added thereto. In this case, an amount of the parity bits may vary depending on an LDCP base graph. A method by which to send all the parity bits generated by LDPC coding for a particular input may be called full buffer rate matching (FBRM), and a method by which to limit the number of parity bits available for transmission may be called limited buffer rate matching (LBRM). When resources are allocated for data transmission, an LDPC encoder output may be made as a circular buffer, and bits of the buffer may be repeatedly transmitted as many as the allocated resources, in which case a length of the circular buffer may be referred to as Ncb. Given that the number of all parity bits generated by LDPC coding is N, Ncb=N in the FBRM method. In the LBRM method, $N_{cb}$ may be min (N, $N_{ref}$), $N_{ref}$ may be given as $$\left\lceil \frac{TBS_{LBRM}}{C \cdot R_{LBRM}} \right\rceil,$$

and $R_{LBRM}$ may be determined to be ⅔. $TBS_{LBRM}$ represents a maximum number of layers supported by the UE in the corresponding cell according to the aforementioned method of obtaining TBS, and in a case of a maximum modulation order configured for the UE in the cell or of no configuration, 64QAM may be assumed with the code rate being the maximum code rate 948/1024, $N_{RE}$ being $156 \cdot n_{PRB}$, and $n_{PRB}$ being $n_{PRB,LBRM}$, $n_{PRB,LBRM}$, may be given in the following Table 3.

TABLE 3

| Maximum number of PRBs across all configured BWPs of a carrier | $n_{PRB,LBRM}$ |
| --- | --- |
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In the NR system, a peak data rate supported by the UE may be determined in the following equation 1:

Equation 1

$$datarate(Mbps) = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)}) \right)$$

In the equation 1, J may refer to the number of carriers grouped by carrier aggregation, Rmax=948/1024, $v_{layers}^{(j)}$ may refer to the maximum number of layers, $Q_m^{(j)}$ may refer to a maximum demodulation order, $f^{(j)}$ may refer to a scaling index, and μ may refer to subcarrier spacing. $f^{(j)}$ may be reported by the UE as one of 1, 0.8, 0.75, and 0.4, and μ may be given in the following Table 4.

TABLE 4

| μ | $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Furthermore, $T_s^\mu$ is an average OFDM symbol length, $T_s^\mu$ may be calculated as $$\frac{10^{-3}}{14 \cdot 2^\mu},$$

and $N_{PRB}^{BW(j),\mu}$ is the maximum number of RBs in BW(j). $OH^{(j)}$ is an overhead value, which may be given as 0.14 for DL and 0.18 for UL in FR1 (a band equal to or less than 6 GHZ), and given as 0.08 for DL and 0.10 for UL in FR2 (a band higher than 6 GHZ). Peak data rates for DL in a cell having 100 MHz frequency bandwidth with 30 kHz subcarrier spacing may be calculated in the equation 1 as in the following Table 5.

TABLE 5

| $f^{(j)}$ | $v_{Layers}^{(j)}$ | $Q_m^{(j)}$ | Rmax | $N_{PRB}^{BW(j),\mu}$ | $T_s^\mu$ | $OH^{(j)}$ | data rate |
| --- | --- | --- | --- | --- | --- | --- | --- |
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |

TABLE 5-continued

| $f^{(j)}$ | $v_{Layers}^{(j)}$ | $Q_m^{(j)}$ | Rmax | $N_{PRB}^{BW(j),\mu}$ | $T_s^\mu$ | $OH^{(j)}$ | data rate |
|---|---|---|---|---|---|---|---|
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate that may be measured by the UE during actual data transmission may be a value obtained by dividing an amount of data by data transmission time. This may be a TBS in 1-TB transmission, and a value obtained by dividing the sum of TBSs by TTI length in 2-TB transmission. For example, actual peak data rates for DL in the cell having 100 MHz frequency bandwidth with 30 kHz subcarrier spacing like the assumption from which Table 5 is obtained may be determined as in the following Table 6 based on the number of allocated PDSCH symbols.

TABLE 6

| $N_{symb}^{sh}$ | $N_{DMRS}^{PRB}$ | $N_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The peak data rates supported by the UE may be seen in Table 5, and the actual data rates based on the allocated TBS may be seen in Table 6. According to scheduling information, the actual data rate may sometimes be higher than the peak data rate.

In a wireless communication system, the new radio (NR) system in particular, data rates supported by the UE may be agreed between the BS and the UE. It may be calculated using a maximum frequency band, a maximum modulation order, the maximum number of layers, etc., which are supported by the UE. However, the calculated data rate may be different from a value calculated from the transport block size (TBS) and transmission time interval (TTI) of a transport block (TB) used for actual data transmission.

Hence, it may happen for the UE to be allocated a TBS greater than a value corresponding to the data rate supported by the UE itself. Such an occasion needs to be minimized, and defining an operation of the UE on this occasion may be required. In an embodiment as will be described below, provided is a method and apparatus for dealing with the occasion when the peak data rate and the actual data rate do not match.

Embodiments of the disclosure will now be described in conjunction with accompanying drawings. In the description of the disclosure, when it is determined that a detailed description of related functions or configurations may unnecessarily obscure the subject matter of the disclosure, the detailed description will be omitted. Further, the terms as will be mentioned later, are defined by taking functionalities as will be described in the disclosure into account, but may vary depending on certain practices or intentions of users or operators. Accordingly, the terms should be defined based on the descriptions throughout this specification. In the following description, a base station is an entity for performing resource allocation for a UE, and may be at least one of a gNB, an eNB, a Node B, a BS, a radio access unit, a base station controller (BSC), or a network node. A terminal may include a UE, an MS, a cellular phone, a smart phone, a computer, or a multimedia system capable of performing a communication function. Herein, downlink (DL) refers to a radio transmission path for a signal transmitted from a BS to a UE, and uplink (UL) refers to a radio transmission path for a signal transmitted from a UE to a BS. Although the following embodiments will focus on an NR system as an example, they may be equally applied to other communication systems with similar technical backgrounds or channel types. Furthermore, embodiments of the disclosure will also be applied to different communication systems with some modifications to such an extent that does not significantly deviate the scope of the disclosure when judged by those of ordinary skill in the art.

In the disclosure, the conventional terms 'physical channel' and 'signal' may be interchangeably used with data or a control signal. For example, a PDSCH is a physical channel on which to transmit data, but in the disclosure, the PDSCH may be referred to as data.

Hereinafter, in the disclosure, higher signaling is a method of transferring a signal to the UE from the BS on a DL data channel of the physical layer or to the BS from the UE on a UL data channel of the physical layer, and may also be referred to as RRC signaling or an MAC control element (CE).

In the disclosure, a peak data rate, a max data rate, a maximum data rate, etc., may be interchangeably used.

Embodiment 1

Embodiment 1 is directed to a method of determining scheduling that exceeds peak data rate, and a method and apparatus for operating a UE when transmission is made to exceed the peak data rate. This will be described in more detail with reference to FIG. 8.

The UE may receive DL control information including scheduling information, interpret the scheduling information, and calculate an actual data rate in the following methods based on the interpretation of the scheduling information. The UE may figure out from the scheduling information an amount of data or a TBS value to be transmitted or received, and may figure out the number of symbols to which the PDSCH or the PUSCH is mapped.

Method 1: A data rate of actual data transmission may be calculated by dividing the scheduled TBS of the PDSCH or PUSCH or the sum of TBS by actual transmission time.

Method 2: A data rate of actual data transmission may be calculated by dividing the scheduled TBS of the PDSCH or PUSCH or the sum of TBS by the product of the allocated number of symbols and an average symbol length $$T_s^\mu = \frac{10^{-3}}{14 \cdot 2^\mu}.$$

Method 3: An actual data rate in a slot may be calculated by obtaining the sum of the size of all TBs included in the PDSCH or PUSCH to be transmitted or received in the slot and dividing the sum of the size of the TBs by the slot length.

The BS and the UE may calculate an actual data rate in one or a combination of the aforementioned methods, and compare the actual data rate with a data rate supported by the UE, which is calculated in the peak data rate calculation method provided in the equation 1. The peak data rate may not be limited to the method provided in the equation 1 but may be modified and applied in other various methods.

When the actual data rate is higher than the peak data rate as a result of the comparison, the UE may generate and transmit HARQ-ACK feedback for the PDSCH as NACK without an attempt at PDSCH decoding in DL scheduling and PDSCH transmission. Also, when the actual data rate is higher than the peak data rate as a result of the comparison, the UE may not transmit the PUSCH in UL scheduling and PUSCH transmission. When the BS makes scheduling for a particular UE, the BS may newly determine a capability of the UE in response to successive occurrences of NACK.

The PDSCH mentioned in the methods 1, 2, and 3 may be data to be transmitted only to the corresponding UE. In other words, control information for scheduling the PDSCH may be limited to a case where a certain C-RNTI mask delivered as a unique value to a particular UE is delivered on the PDCCH. That is, the PDSCH delivered for system information transmission, paging, or random access may be excluded from the above calculation. In another method, it is also possible to use and apply the sum of the number of data bits included in all the PDSCHs no matter what purposes they have.

Figure 8:
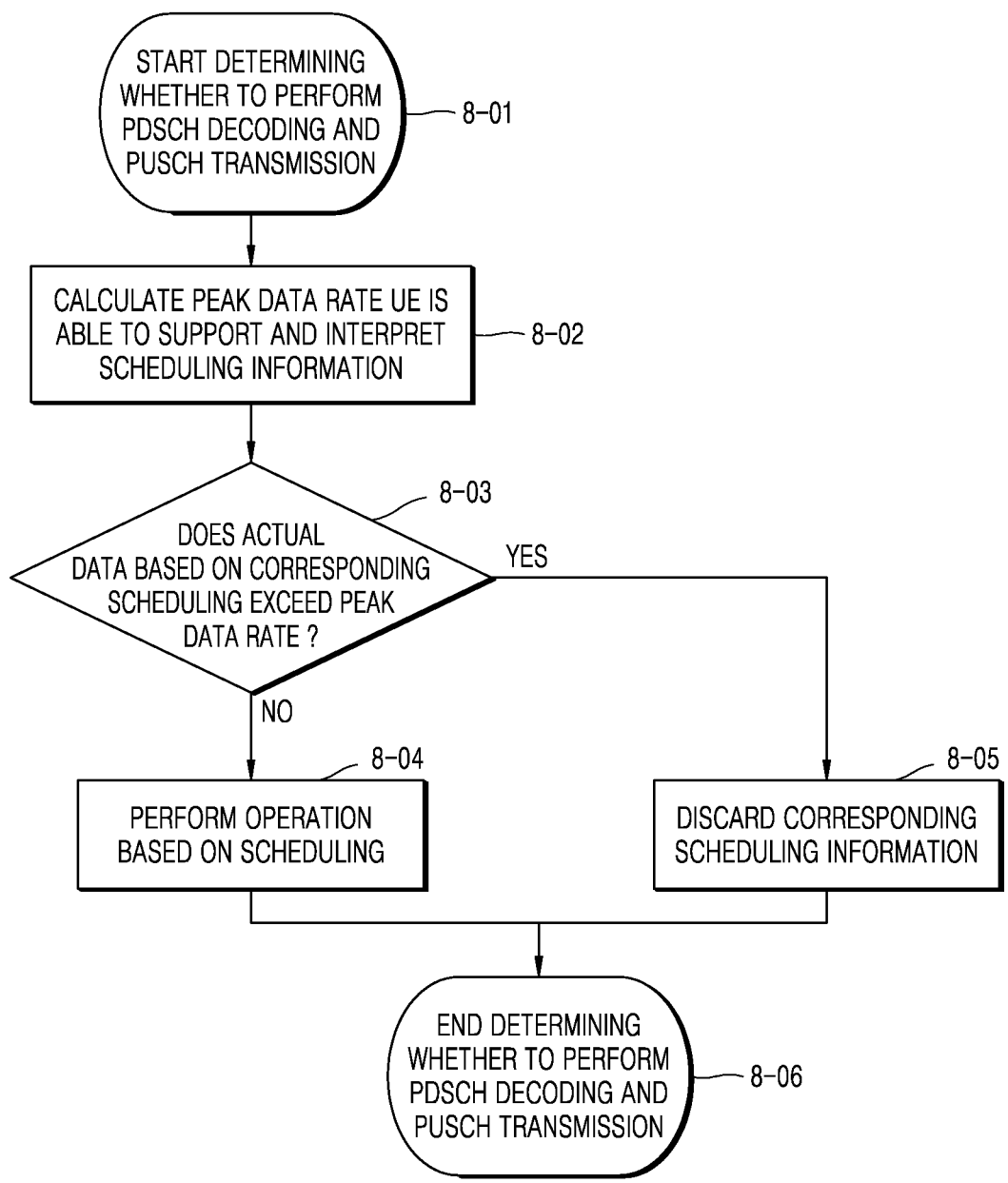
FIG. 8 is a flowchart for describing a method by which a terminal determines whether to decode a physical downlink shared channel (PDSCH) and transmit a physical uplink control channel (PUCCH), according to an embodiment.

FIG. 8 is a flowchart for describing a method by which a UE determines whether to decode a PDSCH and transmit a PUSCH, according to an embodiment.

A BS and a UE may start a process of determining whether to perform PDSCH decoding and PUSCH transmission, in operation 8-01.

The BS and the UE may calculate a peak data rate the UE is able to support, and determine scheduling information for particular data transmission, in operation 8-02. The peak data rate may be calculated in the equation 1 or a modified method.

The BS and the UE may calculate an actual data rate from the scheduling information and compare the actual data rate with the peak data rate, in operation 8-03.

When the actual data rate exceeds the peak data rate, the corresponding scheduling information may be ignored, in operation 8-05. Ignoring the corresponding scheduling information may mean that the UE will not transmit the scheduled PUSCH for PUSCH transmission. Alternatively, the UE may usually generate and transmit HARQ-ACK feedback for the corresponding PDSCH as NACK to the BS, but in an exceptional case, may not transmit the HARQ-ACK feedback to the BS. The exceptional case may be a case where the terminal is scheduled with fallback mode DCI or DCI format 1_0 and receives indication from DAI that only one PDSCH has been transmitted, or a case where only one PDSCH is transmitted without configuration of carrier aggregation. In addition, the exceptional case may be a case where only HARQ-ACK for one PDSCH is transmitted.

Furthermore, when the actual data rate does not exceed the peak data rate as a result of the comparison in operation 8-03, the BS and the UE may perform data transmission or reception according to the scheduling information, in operation 8-04.

With the aforementioned operations performed, the process of determining whether to perform PDSCH decoding and PUSCH transmission may be completed, in operation 8-06.

In the obtaining of the sum of the TBSs, obtaining the sum of the TBSs of the received PDSCH may refer to a case of obtaining the sum of PDSCHs received simultaneously in several CCs or in the same slot or in the same point in time by the UE configured with the several CCs to perform CA.

Embodiment 1-1

Embodiment 1-1 provides a method by which a BS performs scheduling not to exceed a peak data rate of a UE.

The UE reports information about its peak data rate to the BS. It may refer to an amount of data the UE is able to process in a unit time. Accordingly, the BS may not transmit data at one time to a particular UE as much as it exceeds the peak data rate of the UE. When the BS determines whether and how to schedule the UE, a method of determining them is required.

The BS may configure and indicate for the UE to measure and report a channel for only a particular frequency band. This may be a sub-band channel quality indicator (CQI), and using this, the BS may allocate a frequency band for the UE based on the sub-band CQI.

The BS receives the sub-band CQI or other channel measurement result reported from the UE. The BS lines up sub-bands or RBs in order of having higher channel gain based on the reported result. Lining up the RBs in the order of having higher channel gain may refer to lining up RB indexes from one having higher sub-band CQI.

The BS schedules the UE from the lined-up RB indexes or RBs having high sub-band CQIs. The BS allocates RBs for the UE to such an extent that does not exceed the peak data rate and does not allocate any more RB.

How to allocate RBs for the UE to such an extent that does not exceed the peak data rate will be described below.

The BS may pre-calculate a TBS value from an MCS index (or a coding rate corresponding to the MCS index) and PRB allocation or a corresponding actual data rate, based on configurations scheduled for the particular UE, and store the TBS value.

| MCS, PRB | 10 | 20 | 30 | 40 | 50 | 60 | 70 | 80 | 90 | 100 | 110 | 120 | 130 | 140 |
|---|---|---|---|---|---|---|---|---|---|---|---|---|---|---|
| 0 | 5.9 | 11.8 | 17.4 | 23.6 | 29.2 | 34.8 | 41.0 | 47.1 | 52.2 | 58.4 | 64.6 | 69.7 | 75.8 | 82.0 |
| 1 | 7.7 | 15.4 | 23.0 | 30.7 | 37.9 | 46.1 | 53.3 | 61.5 | 69.7 | 75.8 | 84.0 | 92.2 | 100.4 | 106.6 |
| 2 | 9.5 | 19.0 | 28.2 | 37.9 | 47.1 | 56.4 | 65.6 | 75.8 | 84.0 | 94.2 | 104.5 | 112.6 | 123.0 | 131.2 |
| 3 | 12.3 | 24.6 | 36.9 | 49.2 | 61.5 | 73.8 | 86.0 | 98.4 | 110.6 | 123.0 | 135.3 | 147.6 | 159.9 | 172.2 |
| 4 | 15.1 | 30.2 | 45.1 | 60.5 | 75.8 | 90.2 | 104.5 | 120.9 | 135.3 | 151.6 | 164.0 | 180.4 | 196.8 | 209.0 |
| 5 | 18.4 | 36.9 | 55.3 | 73.8 | 92.2 | 110.6 | 129.1 | 147.6 | 168.0 | 184.4 | 205.0 | 221.4 | 241.7 | 258.1 |
| 6 | 22.0 | 44.0 | 65.6 | 88.1 | 108.6 | 131.2 | 151.6 | 176.2 | 196.8 | 217.1 | 241.7 | 262.4 | 287.0 | 303.2 |
| 7 | 25.6 | 51.2 | 77.9 | 102.4 | 129.1 | 155.8 | 180.4 | 205.0 | 229.6 | 258.1 | 278.8 | 311.4 | 336.0 | 360.5 |
| 8 | 29.2 | 58.4 | 88.1 | 116.8 | 147.6 | 176.2 | 205.0 | 233.6 | 262.4 | 295.2 | 319.8 | 352.4 | 385.3 | 409.6 |
| 9 | 32.8 | 65.6 | 98.4 | 131.2 | 164.0 | 196.8 | 233.6 | 262.4 | 295.2 | 327.9 | 360.5 | 393.3 | 434.3 | 467.2 |
| 10 | 16.4 | 32.8 | 50.2 | 65.6 | 82.0 | 100.4 | 116.8 | 131.2 | 147.6 | 164.0 | 184.4 | 200.8 | 217.1 | 233.6 |
| 11 | 18.4 | 36.9 | 55.3 | 73.8 | 92.2 | 110.6 | 129.1 | 147.6 | 164.0 | 184.4 | 200.8 | 221.4 | 237.8 | 258.1 |
| 12 | 21.0 | 42.0 | 63.5 | 84.0 | 106.6 | 127.1 | 147.6 | 168.0 | 188.6 | 213.2 | 233.6 | 254.2 | 278.8 | 295.2 |
| 13 | 24.1 | 48.2 | 71.7 | 96.3 | 118.9 | 143.4 | 168.0 | 192.6 | 213.2 | 237.8 | 262.4 | 287.0 | 311.4 | 336.0 |
| 14 | 27.1 | 54.3 | 79.9 | 108.6 | 135.3 | 159.9 | 188.6 | 217.1 | 241.7 | 270.6 | 295.2 | 319.8 | 352.4 | 376.9 |
| 15 | 30.2 | 60.5 | 90.2 | 120.9 | 151.6 | 180.4 | 209.0 | 241.7 | 270.6 | 303.2 | 327.9 | 360.5 | 393.3 | 418.0 |
| 16 | 32.3 | 64.6 | 96.3 | 129.1 | 159.9 | 192.6 | 225.5 | 258.1 | 287.0 | 319.8 | 352.4 | 385.3 | 418.0 | 451.0 |
| 17 | 21.5 | 43.0 | 64.6 | 86.0 | 106.6 | 129.1 | 147.6 | 172.2 | 192.6 | 213.2 | 233.6 | 258.1 | 278.8 | 295.2 |
| 18 | 22.5 | 45.1 | 67.6 | 90.2 | 112.6 | 135.3 | 159.9 | 180.4 | 205.0 | 225.5 | 250.1 | 270.6 | 295.2 | 319.8 |
| 19 | 25.1 | 50.2 | 75.8 | 100.4 | 127.1 | 151.6 | 176.2 | 200.8 | 225.5 | 254.2 | 278.8 | 303.2 | 327.9 | 352.4 |
| 20 | 27.7 | 55.3 | 82.0 | 110.6 | 139.4 | 164.0 | 192.6 | 221.4 | 250.1 | 278.8 | 303.2 | 327.9 | 360.5 | 385.3 |
| 21 | 30.2 | 60.5 | 90.2 | 120.9 | 151.6 | 180.4 | 209.0 | 241.7 | 270.6 | 303.2 | 327.9 | 360.5 | 393.3 | 418.0 |
| 22 | 32.3 | 64.6 | 98.4 | 129.1 | 164.0 | 196.8 | 225.5 | 258.1 | 295.2 | 327.9 | 360.5 | 393.3 | 426.3 | 451.0 |
| 23 | 34.8 | 69.7 | 104.5 | 139.4 | 176.2 | 209.0 | 246.0 | 278.8 | 319.8 | 352.4 | 385.3 | 418.0 | 458.9 | 491.8 |
| 24 | 37.9 | 75.8 | 112.6 | 151.6 | 188.6 | 225.5 | 262.4 | 303.2 | 336.0 | 376.9 | 418.0 | 451.0 | 491.8 | 524.6 |
| 25 | 39.9 | 79.9 | 120.9 | 159.9 | 200.8 | 241.7 | 278.8 | 319.8 | 360.5 | 401.6 | 442.6 | 483.5 | 524.6 | 557.4 |
| 26 | 43.0 | 86.0 | 127.1 | 172.2 | 213.2 | 254.2 | 295.2 | 344.4 | 385.3 | 426.3 | 467.2 | 508.0 | 557.4 | 590.1 |
| 27 | 44.0 | 88.1 | 131.2 | 176.2 | 221.4 | 262.4 | 311.4 | 352.4 | 401.6 | 442.6 | 491.8 | 524.6 | 573.5 | 622.8 |
| 28 | 46.1 | 92.2 | 139.4 | 184.4 | 229.6 | 278.8 | 319.8 | 368.9 | 418.0 | 458.9 | 508.0 | 557.4 | 606.5 | 639.0 |

| MCS, PRB | 150 | 160 | 170 | 180 | 190 | 200 | 210 | 220 | 230 | 240 | 250 | 260 | 270 |
|---|---|---|---|---|---|---|---|---|---|---|---|---|---|
| 0 | 88.1 | 94.2 | 100.4 | 104.5 | 110.6 | 116.8 | 123.0 | 129.1 | 135.3 | 139.4 | 147.6 | 151.6 | 159.9 |
| 1 | 114.8 | 123.0 | 131.2 | 139.4 | 143.4 | 151.6 | 159.9 | 168.0 | 176.2 | 184.4 | 192.6 | 200.8 | 205.0 |
| 2 | 139.4 | 151.6 | 159.9 | 168.0 | 180.4 | 188.6 | 196.8 | 209.0 | 217.1 | 225.5 | 233.6 | 246.0 | 254.2 |
| 3 | 184.4 | 196.8 | 209.0 | 221.4 | 233.6 | 246.0 | 258.1 | 270.6 | 278.8 | 295.2 | 303.2 | 319.8 | 327.9 |
| 4 | 225.5 | 241.7 | 254.2 | 270.6 | 287.0 | 303.2 | 311.4 | 327.9 | 344.4 | 360.5 | 376.9 | 393.3 | 401.6 |
| 5 | 278.8 | 295.2 | 311.4 | 336.0 | 352.4 | 368.9 | 385.3 | 409.6 | 426.3 | 442.6 | 458.9 | 483.5 | 500.1 |
| 6 | 327.9 | 352.4 | 368.9 | 393.3 | 418.0 | 434.3 | 458.9 | 483.5 | 500.1 | 524.6 | 540.8 | 573.5 | 590.1 |
| 7 | 385.3 | 409.6 | 434.3 | 458.9 | 483.5 | 516.3 | 540.8 | 557.4 | 590.1 | 622.8 | 639.0 | 672.0 | 688.8 |
| 8 | 442.6 | 467.2 | 500.1 | 524.6 | 557.4 | 590.1 | 622.8 | 639.0 | 672.0 | 704.9 | 737.8 | 770.6 | 786.6 |
| 9 | 500.1 | 524.6 | 557.4 | 590.1 | 622.8 | 655.8 | 688.8 | 721.0 | 753.8 | 786.6 | 836.0 | 868.6 | 901.3 |
| 10 | 250.1 | 262.4 | 278.8 | 295.2 | 311.4 | 327.9 | 344.4 | 368.9 | 385.3 | 401.6 | 418.0 | 434.3 | 451.0 |
| 11 | 278.8 | 295.2 | 311.4 | 327.9 | 352.4 | 368.9 | 385.3 | 401.6 | 426.3 | 442.6 | 458.9 | 475.6 | 500.1 |
| 12 | 319.8 | 336.0 | 360.5 | 376.9 | 401.6 | 426.3 | 442.6 | 467.2 | 483.5 | 508.0 | 524.6 | 557.4 | 573.5 |
| 13 | 360.5 | 385.3 | 409.6 | 426.3 | 451.0 | 475.6 | 500.1 | 524.6 | 557.4 | 573.5 | 590.1 | 622.8 | 639.0 |
| 14 | 401.6 | 434.3 | 458.9 | 483.5 | 516.3 | 540.8 | 573.5 | 590.1 | 622.8 | 639.0 | 672.0 | 704.9 | 721.0 |
| 15 | 451.0 | 483.5 | 508.0 | 540.8 | 573.5 | 606.5 | 622.8 | 655.8 | 688.8 | 721.0 | 753.8 | 786.6 | 803.3 |
| 16 | 483.5 | 516.3 | 540.8 | 573.5 | 606.5 | 639.0 | 672.0 | 704.9 | 737.8 | 770.6 | 803.3 | 836.0 | 868.6 |
| 17 | 319.8 | 344.4 | 360.5 | 385.3 | 409.6 | 426.3 | 451.0 | 467.2 | 491.8 | 516.3 | 540.8 | 557.4 | 573.5 |
| 18 | 344.4 | 360.5 | 385.3 | 409.6 | 434.3 | 451.0 | 475.6 | 500.1 | 524.6 | 540.8 | 573.5 | 590.1 | 606.5 |
| 19 | 376.9 | 401.6 | 426.3 | 451.0 | 475.6 | 508.0 | 524.6 | 557.4 | 573.5 | 606.5 | 622.8 | 655.8 | 688.8 |
| 20 | 418.0 | 442.6 | 467.2 | 500.1 | 524.6 | 557.4 | 573.5 | 606.5 | 639.0 | 655.8 | 688.8 | 721.0 | 753.8 |
| 21 | 451.0 | 483.5 | 508.0 | 540.8 | 573.5 | 606.5 | 622.8 | 655.8 | 688.8 | 721.0 | 753.8 | 786.6 | 803.3 |
| 22 | 483.5 | 516.3 | 557.4 | 590.1 | 622.8 | 655.8 | 688.8 | 721.0 | 753.8 | 786.6 | 819.3 | 852.7 | 885.3 |
| 23 | 524.6 | 557.4 | 590.1 | 639.0 | 672.0 | 704.9 | 737.8 | 770.6 | 803.3 | 836.0 | 868.6 | 918.2 | 951.0 |
| 24 | 557.4 | 606.5 | 639.0 | 672.0 | 721.0 | 753.8 | 786.6 | 836.0 | 868.6 | 901.3 | 934.2 | 983.7 | 1016.4 |
| 25 | 606.5 | 639.0 | 688.8 | 721.0 | 753.8 | 803.3 | 836.0 | 885.3 | 918.2 | 966.9 | 999.6 | 1049.0 | 1081.5 |
| 26 | 639.0 | 688.8 | 721.0 | 770.6 | 803.3 | 852.7 | 901.3 | 934.2 | 983.7 | 1016.4 | 1049.0 | 1115.0 | 1147.5 |
| 27 | 672.0 | 704.9 | 753.8 | 803.3 | 836.0 | 885.3 | 934.2 | 983.7 | 1016.4 | 1049.0 | 1115.0 | 1147.5 | 1213.0 |
| 28 | 688.8 | 737.8 | 786.6 | 836.0 | 885.3 | 918.2 | 966.9 | 1016.4 | 1049.0 | 1115.0 | 1147.5 | 1213.0 | 1245.5 |

The above table presents data rate values in Mbps, which are determined according to the dimension of the TBS that may be determined based on the MCS index and the number of allocated PRBs. The above example may be a case where transmission is performed with 4 layers, 256QAM, and 14-symbol allocation. When the peak data rate value of the UE is 866.7 Mbps, dark-colored portions in the table are a region scheduled with the TBS corresponding to higher data rates than the peak data rate of the UE. Accordingly, the BS needs to perform scheduling without using a combination of an MCS index and the number of RBs that leads to a data rate higher than the peak data rate of the UE. To perform this, the BS may store values as in the above table, or combinations unavailable for scheduling, or store the maximum number of PRBs that may be allocated for a particular MCS. This may be presented in e.g., the following table.

| | max PRB | | | |
|---|---|---|---|---|
| MCS | f = 1 | f = 0.8 | f = 0.75 | f = 0.4 |
| 0 | 273 | 273 | 273 | 273 |
| 1 | 273 | 273 | 273 | 273 |

-continued

| MCS | max PRB | | | |
|-----|-------|---------|----------|---------|
|     | f = 1 | f = 0.8 | f = 0.75 | f = 0.4 |
| 2   | 273 | 273 | 273 | 273 |
| 3   | 273 | 273 | 273 | 273 |
| 4   | 273 | 273 | 273 | 273 |
| 5   | 273 | 273 | 273 | 250 |
| 6   | 273 | 273 | 273 | 211 |
| 7   | 273 | 273 | 273 | 180 |
| 8   | 273 | 273 | 273 | 157 |
| 9   | 273 | 273 | 259 | 139 |
| 10  | 273 | 273 | 273 | 273 |
| 11  | 273 | 273 | 273 | 251 |
| 12  | 273 | 273 | 273 | 218 |
| 13  | 273 | 273 | 273 | 193 |
| 14  | 273 | 273 | 273 | 171 |
| 15  | 273 | 273 | 273 | 154 |
| 16  | 273 | 273 | 268 | 144 |
| 17  | 273 | 273 | 273 | 216 |
| 18  | 273 | 273 | 273 | 203 |
| 19  | 273 | 273 | 273 | 183 |
| 20  | 273 | 273 | 273 | 167 |
| 21  | 273 | 273 | 273 | 154 |
| 22  | 273 | 273 | 264 | 142 |
| 23  | 273 | 264 | 245 | 132 |
| 24  | 273 | 245 | 228 | 122 |
| 25  | 273 | 231 | 214 | 115 |
| 26  | 273 | 217 | 202 | 108 |
| 27  | 262 | 208 | 193 | 104 |
| 28  | 251 | 200 | 186 | 100 |

The above table records the maximum number of PRBs that may be allocated for the UE in a particular configuration with an MCS index and a scaling factor f reported by the UE at the peak data rate. The particular configuration may be changed, so that the BS may newly calculate the number of PRBs that may be allocated for the UE whenever the associated scheduling configuration is changed.

Embodiment 1-2

Embodiment 1-2 is directed to another example of a method of determining scheduling that exceeds the peak data rate, and a method and apparatus for operating a UE when transmission is made to exceed the peak data rate.

The UE may receive DL control information including scheduling information, interpret the scheduling information, and calculate an actual data rate in the following methods based on the interpretation of the scheduling information. The UE may figure out from the scheduling information an amount of data or a TBS value to be transmitted or received, and may figure out the number of symbols to which the PDSCH or the PUSCH is mapped. Accordingly, a data rate for actual data transmission may be obtained by dividing the sum of the size of code blocks actually included in the PDSCH or PUSCH being currently transmitted by an actual transmission time. This may be results from consideration that retransmission may be performed in code block groups (CBGs). That is, for DL, the UE is to calculate an actual data rate by considering all code blocks included in PDSCHs transmitted at a particular point in time, among component carriers (CCs) included in a CC group of a particular unit. For UL, the UE is to calculate the actual data rate by considering all code blocks included in PUSCHs transmitted at a particular point in time among CCs included in a CC group of a particular unit. The PDSCHs transmitted at a particular point in time may refer to PDSCHs mapped to OFDM symbols including the particular point in time.

The actual data rate in DL data transmission may be calculated in the following equation 1-1:

$$10^{-6} \sum_{j=0}^{J-1} \frac{\sum_{r=0}^{C_{DL-SCH}^{(j)}} K_r^{(j)}}{N_{symb}^{sh,(j)} \cdot T_s^{\mu,(j)}} \qquad \text{Equation 1-1}$$

$C_{DL-SCH}^{(j)}$ may refer to the number of code blocks for DL-SCH transmitted on the j-th PDSCH when DCI scheduling the j-th PDSCH includes code block group transmission information (CBGTI) and the CBGTI indicates that the r-th code block is not transmitted, $K_r^{(j)}=0$; otherwise, $K_r^{(j)}$ may be defined as a size of the r-th code block for DL-SCH transmitted on the j-th PDSCH. (if the DCI format scheduling the PDSCH transmission includes a CBGTI field indicating that the UE shall not transmit the r-th code block, $K_r^{(j)}=0$; otherwise, $K_r^{(j)}$ is the r-th code block size for DL-SCH of the j-th PDSCH transmission)

$T_s^{\mu^{(j)}}$ may be defined as an average symbol length of symbols to which the j-th PDSCH is mapped, and may usually be a value calculated in consideration of cyclic prefix. (average OFDM symbol duration for numerology $\mu^{(j)}$ of the j-th PDSCH, i.e.

$$T_s^{\mu^{(j)}} = \frac{10^{-3}}{14 \cdot 2^{\mu^{(j)}}}.$$

Note that normal cyclic prefix is assumed)

$N_{symb}^{sh,(j)}$ may be the number of OFDM symbols, to which the j-th PDSCH is mapped in a slot or which is allocated for the j-th PDSCH transmission. (the number of symbols of the j-th PDSCH allocation within the slot)

J may refer to the number of PDSCHs transmitted at a particular point in time in a particular serving cell or in a CC group unit.

The actual data rate calculated in the equation 1-1 may be compared with the DL peak data rate of the UE calculated using the equation 1, and when the actual data rate is higher than the peak data rate from the comparison, the UE may generate and transmit HARQ-ACK feedback for the PDSCH as NACK without an attempt at PDSCH decoding in DL scheduling and PDSCH transmission. When the BS makes scheduling for a particular UE, the BS may newly determine a capability of the UE in response to successive occurrences of NACK.

The PDSCH mentioned in the equation 1-1 may be data to be transmitted only to the corresponding UE. In other words, control information for scheduling the PDSCH may be limited to a case where a certain C-RNTI mask delivered as a unique value to a particular UE is delivered on the PDCCH. That is, the PDSCH delivered for system information transmission, paging, or random access may be excluded from the above calculation. In another method, it is also possible to use and apply the sum of the number of data bits included in all the PDSCHs no matter what purposes they have.

The actual data rate in UL data transmission may be calculated in the following equation 1-2:

$$10^{-6} \sum_{j=0}^{J-1} \frac{\sum_{r=0}^{C_{UL-SCH}^{(j)}} K_r^{(j)}}{N_{symb}^{sh,(j)} \cdot T_s^{\mu,(j)}}$$

Equation 1-2

$C_{UL-SCH}^{(j)}$ may refer to the number of code blocks for UL-SCH transmitted on the j-th PUSCH
  when DCI scheduling the j-th PUSCH includes code block group transmission information (CBGTI) and the CBGTI indicates that the r-th code block is not transmitted, $K_r^{(j)}=0$; otherwise, $K_r^{(j)}$ may be defined as a size of the r-th code block for UL-SCH transmitted on the j-th PUSCH. (if the DCI format scheduling the PUSCH transmission includes a CBGTI field indicating that the UE shall not transmit the r-th code block, $K_r^{(j)}=0$; otherwise, $K_r^{(j)}$ is the r-th code block size for UL-SCH of the j-th PUSCH transmission)
$T_s^{\mu(j)}$ may be defined as an average symbol length of symbols to which the j-th PUSCH is mapped, and may usually be a value calculated in consideration of cyclic prefix. (average OFDM symbol duration for numerology $\mu^{(j)}$ of the j-th PUSCH, i.e.

$$T_s^{\mu(j)} = \frac{10^{-3}}{14 \cdot 2^{\mu(j)}}.$$

Note that normal cyclic prefix is assumed)
$N_{symb}^{sh,(j)}$ may be the number of OFDM symbols, to which the j-th PUSCH is mapped in a slot or which is allocated for the j-th PUSCH transmission. (the number of symbols of the j-th PUSCH allocation within the slot)
J may refer to the number of PUSCHs transmitted at a particular point in time in a particular serving cell or in a CC group unit.

The actual data rate calculated in the equation 1-2 may be compared with the UL peak data rate of the UE calculated using the equation 1, and when the actual data rate is higher than the peak data rate from the comparison, the UE may not transmit the PUSCH in UL scheduling and PUSCH transmission.

Embodiment 1-3

Embodiment 1-3 provides details of the method 3 in the embodiment 1 where an actual data rate in a slot may be calculated by obtaining the sum of the sizes of all TBs included in the PDSCH or the PUSCH to be transmitted or received in the slot and dividing the sum of the size of the TBs by the slot length.

The above embodiments provide methods by which the size of a scheduled TB does not exceed a value corresponding to the peak data rate supported by the UE. However, when the method using the equation 1-1 or 1-2 is used, it may not be possible to perform TB-based retransmission using a fewer number of OFDM symbols than the number of symbols used for initial transmission. For example, when a maximum MCS and 14 OFDM symbols are used in data transmission with 30 kHz subcarrier spacing and 273 PRBs, a peak data rate or max data rate of the UE may be 2.295 Mbps, and accordingly, a maximum TBS that may be scheduled has 1,147,488 bits. When initial transmission with the TBS fails, and only 13 symbols are used for retransmission, the PDSCH or PUSCH is 13 symbols long and the corresponding data rate is higher than the peak data rate of the UE. Accordingly, retransmission with 13 symbols in the case is not feasible. Hence, it may be better to use the method by which the sum of the TBSs included in the PDSCH or PUSCH transmitted in the corresponding slot is divided by the slot length, and then compared with the peak data rate of the UE.

Figure 11:
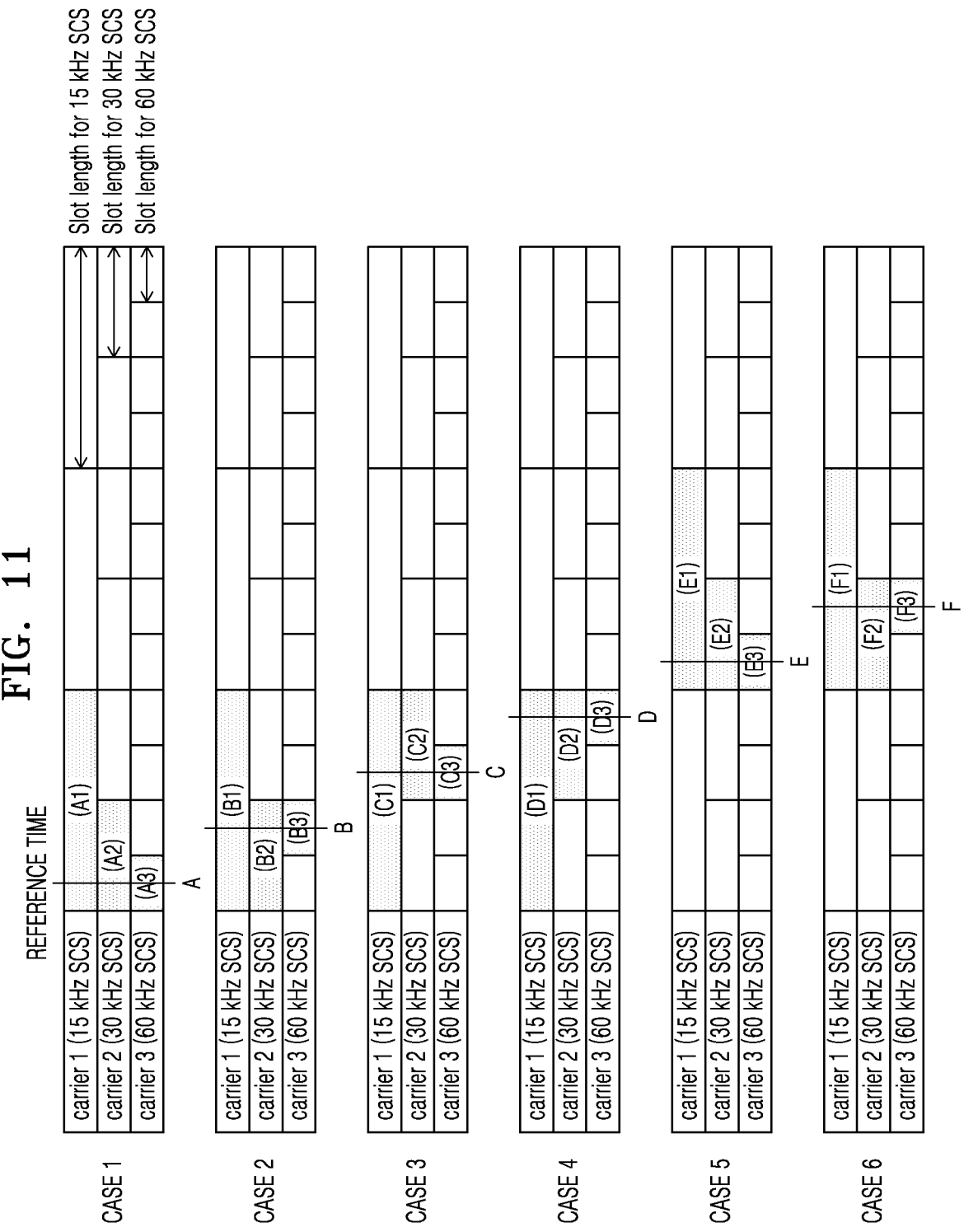
FIG. 11 illustrates an example of determining a slot including a particular point in time to calculate an actual average data rate at the particular point in time on a carrier configured for a terminal in higher signaling.

An actual data rate of the UE at a particular point in time (or reference time) may be determined by considering the sum of the total number of bits of TBs or CBs included in the scheduled PDSCH or PUSCH in the slot including the point in time. The slot including the particular point in time may be determined as shown in FIG. 11. FIG. 11 illustrates an example of determining a slot including a particular point in time on a carrier configured for a UE in higher signaling. Each carrier may have different slot length depending on the subcarrier spacing, and the slots shown are slots including the particular point in time. As the particular point in time changes, e.g., from reference time A to reference time B, slots including the particular point in time may be changed e.g., from slots A1, A2, and A3 to slots B1, B2, and B3. In an example of FIG. 11, slot A1 and slot B1 may be the same slot, and slot A2 and slot B2 may be the same slot. Accordingly, for example, to calculate an average actual data rate of the UE at reference time A, only the PDSCH or PUSCH mapped to the slots including the particular point in time, i.e., reference time A, (i.e., slots A1, A2, and A2) may be considered and code blocks transmitted on the PDSCH or PUSCH may be used. When the reference time changes from D to E, slots including the reference time change from D1, D2, D3 to E1, E2, and E3, in which case all the slots including the reference time are changed. The UE may perform operations for PDSCH reception and PUSCH transmission only when scheduled such that the actual data rate calculated as described above is lower than its peak data rate calculated as in the equation 1, and when the actual data rate calculated is higher than its peak data rate, the UE may skip the operations for PDSCH reception and PUSCH transmission in the corresponding slot. In the embodiment, a slot including the reference time may be called an overlapped slot.

The above method may be performed again as follows.

The UE is not required to handle overlapped PDSCH/PUSCH transmissions that do not satisfy the following conditions at all points in time, in which case all PDSCHs/PUSCHs included in the slot including the particular point in time for a given carrier in a cell group are considered, and the slots including the particular point in time may be explained as overlapped slots.

$$\sum_{j=0}^{J-1} \frac{\sum_{m=0}^{M-1} C'_{j,m} \times K_{j,m}}{T_{slot}^{\mu(j)}} \leq DataRate[Mbps]$$

Equation 1-3

$C'_{j,m}$ denotes the number of scheduled code blocks of the transport block C in the m-th PDSCH/PUSCH in the overlapped slot of the j-th carrier in the cell group
J denotes the number of carriers that make up the cell group
$K_{j,m}$ denotes the number of bits in a code block of the m-th PDSCH/PUSCH in the overlapped slot of the j-th carrier in the cell group in slot length $T_{slot}^{m(j)}=10^{-3}/2^{m(j)}$, m(j) denotes a numerology for a slot of the j-th carrier in the cell group Datarate is computed based on an approximate data rate given in Subclause 4.1.2 in [3GPP TS 38.306] applied for each frequency range per CG unit.

That is, $C'_{j,m}$ is a number of a scheduled code block included in the scheduled PDSCH or PUSCH in the overlapped slot in the j-th carrier of a particular cell group, $K_{j,m}$ is a size of a scheduled code block included in the m-th PDSCH or PUSCH scheduled in the overlapped slot in the j-th carrier in the particular cell group, and $T_{slot}^{m(j)}$ is a slot length when the j-th carrier in the particular cell group has subcarrier spacing m(j). 0 for m(j) means 15 kHz subcarrier spacing, 1 for m(j) means 30 kHz subcarrier spacing, 2 for m(j) means 60 kHz subcarrier spacing, and 3 for m(j) means 120 kHz subcarrier spacing. DateRate may be determined in a method provided in the equation 1 or calculated in a method of determining a peak data rate of a UE provided in the 3GPP standard TS38.306. \*\*daterate→datarate\*\*J is the number of carriers configured for the UE in the corresponding cell group.

Embodiment 2

Embodiment 2 provides a method of calculating a peak data rate instead of the equation 1.

First, TBSmax may be defined as a maximum TBS available for transmission in one slot. To this end, in the aforementioned method of obtaining the TBS, the maximum number of layers supported by the UE in the cell and a maximum modulation order configured for the UE in the cell may be applied, the code rate is assumed to be the maximum code rate 948/1024, and nPRB may be determined as the number of PRBs $N_{RE}=156 \cdot n_{PRB}$, $N_{RE}=158 \cdot n_{PRB}$ or $N_{RE}=160 \cdot n_{PRB}$ in the corresponding frequency band. $N_{RE}$ is a multiple of $n_{PRB}$, which may be modified and applied in various ways.

When the UE is configured with 2-codeword or 2-TB transmission in the particular cell, TBSmax, 1 and TBSmax, 2 may be defined for the respective TBs. To obtain TBSmax, 1 and TBSmax, 2, the UE may assume the maximum number of layers available for each TB and calculate TBSmax, 1 and TBSmax, 2 in the same manner as for the TBSmax as described above. Assuming that $TBS_{max,i}^{(j)}$ is the largest TBS of the i-th TB in the j-the configured cell, the peak data rate may be calculated in the following equation 2:

$$\text{data rate (in } Mbps) = 10^{-3} \cdot \sum_{j=1}^{J} \sum_{i=1}^{CW} \left(2^{\mu} \cdot TBS_{max,i}^{(j)}\right) \quad \text{Equation 2}$$

In the equation 2, μ may be given to be 0, 1, 2, 3, 4 for subcarrier spacings 15 kHz, 30 kHz, 60 kHz, 120 kHz, and 240 kHz, respectively.

Figure 9:
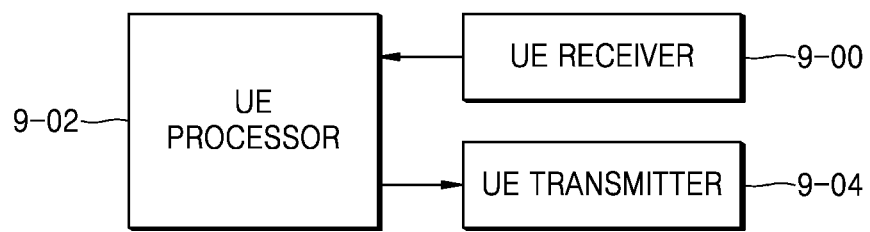
FIG. 9 is a block diagram of a terminal, according to an embodiment.
Figure 10:
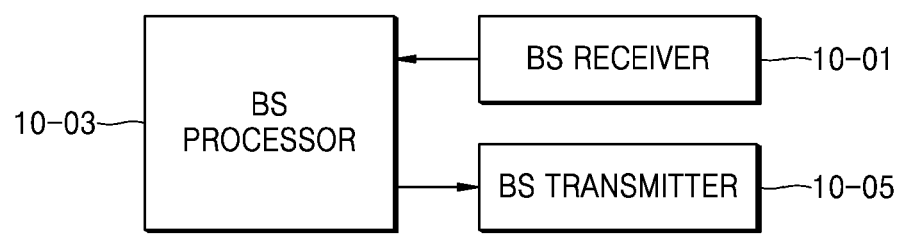
FIG. 10 is a block diagram of a base station, according to an embodiment.

Transmitters, receivers, and processors of the UE and the BS to implement the embodiments of the disclosure are shown in FIGS. 9 and 10, respectively. The receivers, processors, and transmitters of the BS and the UE may be operated according to the aforementioned embodiments of the disclosure to calculate an actual data rate as in the embodiment 1 or 2 and perform a transmission or reception method.

FIG. 9 is a block diagram of a UE, according to an embodiment.

As shown in FIG. 9, a UE may include a UE receiver 9-00, a UE transmitter 9-04, and a UE processor 9-02. The UE receiver 9-00 and the UE transmitter 9-04 may be collectively called a transceiver in the disclosure. The transceiver may transmit or receive signals to or from a BS. The signals may include control information and data. To this end, the transceiver may include an RF transmitter for up-converting the frequency of a signal to be transmitted and amplifying the signal and an RF receiver for low-noise amplifying a received signal and down-converting the frequency of the received signal.

In addition, the transceiver may receive a signal on a wireless channel and output the signal to the UE processor 9-02, or transmit a signal output from the UE processor 9-02 on a wireless channel. The UE processor 9-02 may control a series of processes for the UE to be operated according to the embodiments of the disclosure. For example, the UE receiver 9-00 may receive control information and data containing scheduling information for data transmission from the BS, and the UE processor 9-02 may determine whether to perform decoding and transmission by comparing a peak data rate of the UE with an amount of scheduled data, and accordingly, perform signal processing. Subsequently, the UE transmitter 9-04 may deliver signals required to be transmitted to the BS.

FIG. 10 is a block diagram of a BS, according to an embodiment.

As shown in FIG. 10, a BS may include a BS receiver 10-01, a BS transmitter 10-05, and a BS processor 10-03. The BS receiver 10-01 and the BS transmitter 10-05 may be collectively called a transceiver in the disclosure. The transceiver may transmit or receive signals to or from a UE. The signals may include control information and data. To this end, the transceiver may include an RF transmitter for up-converting the frequency of a signal to be transmitted and amplifying the signal and an RF receiver for low-noise amplifying a received signal and down-converting the frequency of the received signal. In addition, the transceiver may receive a signal on a wireless channel and output the signal to the BS processor 10-03, or transmit a signal output from the BS processor 10-03 on a wireless channel.

The BS processor 10-03 may control a series of processes for the BS to be operated according to the embodiments of the disclosure. For example, the BS processor 10-03 may calculate a peak data rate of the UE, determine and schedule a TBS within a range that does not exceed the peak data rate, and generate control information.

Subsequently, the BS transmitter 10-05 may transmit the control information, and the BS receiver 10-01 may receive a feedback or UL data signal from the UE.

Several embodiments have been described above, but a person of ordinary skill in the art will understand and appreciate that various modifications can be made without departing the scope of the present disclosure. Thus, it will be apparent to those ordinary skilled in the art that the disclosure is not limited to the embodiments described, which have been provided only for illustrative purposes. Furthermore, the embodiments of the disclosure may be operated by being combined with one another if necessary. For example, it is possible to apply a combination of the embodiment 1 and the embodiment 2, or a combination of a portion of the embodiment 1 and a portion of the embodiment 2. Although the embodiments of the disclosure are proposed based on an LTE system, a 5G system, etc., modifications to the embodiments of the disclosure, which do not deviate from the scope of the disclosure, may be applicable.

The invention claimed is:

1. A method, performed by a terminal, of transmitting or receiving a signal, the method comprising:
receiving downlink control information regarding a transport block (TB) in a physical downlink shared channel (PDSCH);
determining a sum of a number of bits in at least one TB transmitted in a slot of each serving cell among configured serving cells, based on the downlink control information;
determining a data rate of the each serving cell based on dividing the sum of the number of the bits of the each serving cell by length of the slot of the each serving cell;
determining a total data rate for the configured serving cells based on summation of the data rate of the each serving cell; and
determining whether to handle PDSCH transmission in the slot of the each serving cell, based on a result of a comparison between a maximum data rate of the terminal and the determined total data rate.

2. The method of claim 1, wherein the determining of whether to handle the PDSCH transmission comprises determining that the terminal is not required to handle the PDSCH transmission in at least one of the slot of the each serving cell among the configured serving cells, in case that the determined total data rate is higher than the maximum data rate.

3. The method of claim 1, wherein the slot of the each serving cell overlaps a certain point in time.

4. A non-transitory computer-readable recording medium having recorded thereon a program to execute the method of claim 1.

5. The method of claim 3, wherein:
a slot $s_j$ of a j-th serving cell among the configured serving cells overlaps with the certain point, and
a length of the slot $s_j$ of the j-th serving cell is determined as $10^{-3}/2^{m(j)}$ wherein m(j) is numerology of the slot $s_j$ of the j-th serving cell.

6. A terminal for transmitting or receiving a signal, the terminal comprising:
a transceiver; and
at least one processor coupled with the transceiver and configured to:
receive downlink control information regarding a transport block (TB) in a physical downlink shared channel (PDSCH);
determine a sum of a number of bits in at least one TB transmitted in a slot of each serving cell among configured serving cells, based on the downlink control information;
determine a data rate of the each serving cell based on dividing the sum of the number of the bits of the each serving cell by a length of the slot of the each serving cell;
determine a total data rate for the configured serving cells based on summation of the data rate of the each serving cell; and
determine whether to handle PDSCH transmission in the slot of the each serving cell, based on a result of a comparison between maximum data rate of the terminal and the determined total data rate.

7. The terminal of claim 6, wherein the at least one processor is further configured to determine that the terminal is not required to handle the PDSCH transmission in at least one of the slot of the each serving cell among the configured serving cells, in case that the determined total data rate is higher than the maximum data rate.

8. The terminal of claim 6, wherein the slot of the each serving cell overlaps with a certain point in time.

9. The terminal of claim 8, wherein:
a slot $s_j$ of a j-th serving cell among the configured serving cells overlaps with the certain point, and
a length of the slot $s_j$ of the j-th serving cell is determined as $10^{-3}/2^{m(j)}$ wherein m(j) is numerology of the slot $s_j$ of the j-th serving cell.

* * * * *